(12) United States Patent
Ramasubramonian et al.

(10) Patent No.: US 11,924,428 B2
(45) Date of Patent: Mar. 5, 2024

(54) SCALE FACTOR FOR QUANTIZATION PARAMETER VALUES IN GEOMETRY-BASED POINT CLOUD COMPRESSION

(71) Applicant: QUALCOMM Incorporated, San Diego, CA (US)

(72) Inventors: Adarsh Krishnan Ramasubramonian, Irvine, CA (US); Louis Joseph Kerofsky, San Diego, CA (US); Bappaditya Ray, San Diego, CA (US); Geert Van der Auwera, Del Mar, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 328 days.

(21) Appl. No.: 17/355,904

(22) Filed: Jun. 23, 2021

(65) Prior Publication Data

US 2021/0409714 A1 Dec. 30, 2021

Related U.S. Application Data

(60) Provisional application No. 63/043,666, filed on Jun. 24, 2020.

(51) Int. Cl.
*H04N 19/124* (2014.01)
*H04N 19/187* (2014.01)
*H04N 19/20* (2014.01)
*H04N 19/70* (2014.01)

(52) U.S. Cl.
CPC ......... *H04N 19/124* (2014.11); *H04N 19/187* (2014.11); *H04N 19/20* (2014.11); *H04N 19/70* (2014.11)

(58) Field of Classification Search
CPC .... H04N 19/124; H04N 19/187; H04N 19/20; H04N 19/70
See application file for complete search history.

(56) References Cited

U.S. PATENT DOCUMENTS 9,066,070 B2 * 6/2015 Su .................. H04N 19/186
9,807,391 B2 * 10/2017 Panchagnula ...... H04N 21/8456
10,554,975 B1 * 2/2020 Li .................. H04N 19/124
(Continued)

FOREIGN PATENT DOCUMENTS

WO 2013003284 A1 1/2013
WO 2018060328 A1 4/2018
WO 2019094184 A1 5/2019

OTHER PUBLICATIONS

International Search Report and Written Opinion—PCT/US2021/038830—ISA/EPO—dated Oct. 13, 2021, 12 pp.
(Continued)

*Primary Examiner* — Gregory M Desire
(74) *Attorney, Agent, or Firm* — QUALCOMM Incorporated; Espartaco Diaz Hidalgo

(57) ABSTRACT

A G-PCC encoder and G-PCC decoder may quantize and scale, respectively, a position of a child node. The G-PCC encoder may control the precision of the quantization and scaling using a quantization parameter (QP) value and a parameter value k, wherein the parameter value k specifies a number of QP points per doubling of a scaling step size to be used at the G-PCC decoder.

36 Claims, 10 Drawing Sheets

(56) References Cited

U.S. PATENT DOCUMENTS

| | | | | |
|---|---|---|---|---|
| 10,694,210 | B2* | 6/2020 | Chou | H04N 19/124 |
| 11,044,478 | B2* | 6/2021 | Tourapis | H04N 19/156 |
| 11,122,268 | B2* | 9/2021 | Regunathan | H04N 19/176 |
| 11,288,843 | B2* | 3/2022 | Joshi | G06T 5/20 |
| 11,373,276 | B2* | 6/2022 | Yea | H04N 19/136 |
| 2021/0211724 | A1* | 7/2021 | Kim | H04N 19/30 |

OTHER PUBLICATIONS

Lee (Samsung) T., et al., "CE4 Subtest 4.1: Higher Granularity of Quantization Parameter Scaling", 8. JCT-VC Meeting, Feb. 1, 2012-Feb. 10, 2012, San Jose, (Joint Collaborative Team on Video Coding of ISO/IEC JTC1/SC29/WG11 and ITU-T SG.16), No. JCTVC-H0336, Feb. 2, 2012 (Feb. 2, 2012), XP030232196, 6 Pages, Retrieved from the Internet: URL: http://phenix.int-evry.fr/jct/doc_end_user/documents/8_San%20Jose/wg11/JCTVC-H0336-v3.zip.JCTVC-H0336 r1.doc. [Retrieved on Feb. 2, 2012], p. 2.

ITU-T H.265: "Series H: Audiovisual and Multimedia Systems, Infrastructure of Audiovisual Services—Coding of Moving Video, High Efficiency Video Coding", The International Telecommunication Union, Jun. 2019, 696 Pages.

3DG: "G-PCC Codec Description v6", Coding of Moving Pictures and Audio, ISO/IEC JTC1/SC29/WG11, N19091, Jan. 2020, Brussels, BE, Mar. 27, 2020, 92 pages.

"Information Technology—MPEG-I (Coded Representation of Immersive Media)—Part 9: Geometry-based Point Cloud Compression", ISO/IEC 23090-9:2020(E), ISO/IEC JTC 1/SC 29/WG 11, 2020, 127 pages.

Lasserre (Blackberry) S., et al., "[GPCC] [CE 13.22 Related] An Improvement of the Planar Coding Mode", 128. MPEG Meeting, Oct. 7, 2019-Oct. 11, 2019, Geneva, (Motion Picture Expert Group or ISO/IEC JTC1/SC29/WG11), No. m50642, Oct. 2, 2019, XP030221087, 3 Pages.

Lasserre (Blackberry), S., et al., "M52958 [GPCC] [CE 13. 22] Report on Azimuthal Coding Mode", 130. MPEG Meeting, Apr. 20, 2020-Apr. 24, 2020, Alpbach, (Motion Picture Expert Group or ISO/IEC JTC1/SC29/WG11), No. m52958 Mar. 18, 2020, XP030285279, 3 Pages.

Lasserre (Blackberry) S., et al., "The Azimuthal Coding Mode", [GPCC][CE13.22 related], 129. MPEG Meeting, Nov. 13, 2020-Nov. 17, 2020, Brussels, (Motion Picture Expert Group or ISO/IEC JTC1/SC29/WG11), No. m51596, Jan. 8, 2020, XP030224661, 31 Pages.

Lasserre S., (Blackberry) et al., "[GPCC] [CE 13.22 ] Report on Angular Coding Mode", 129. MPEG Meeting, Jan. 13, 2020-Jan. 17, 2020, Brussels, (Motion Picture Expert Group or ISO/IEC JTC1/SC29/WG11). No. M51594, Jan. 8, 2020, XP030224657, 4 Pages.

Ramasubramonian (Qualcomm) A.K., et al., "[G-PCC] CE13.29 Report on Geometry Quantization QP Control", 131. MPEG Meeting, Jun. 29, 2020-Jul. 3, 2020, Online, (Motion Picture Expert Group or ISO/IEC JTC1/SC29/WG11), No. M54610, Jun. 22, 2020, XP030289108, 12 Pages.

"Text of ISO/IEC 23090-9 DIS Geometry-Based Point Cloud Compression", 129. MPEG Meeting, Jan. 13, 2020-Jan. 17, 2020, Brussels, (Motion Picture Expert Group or ISO/IEC JTC1/SC29/WG11), No. n19088, Apr. 20, 2020 (Apr. 20, 2020), XP030287970, 126 Pages, Retrieved from the Internet: URL:http://phenix.int-evry.fr/mpeg/doc_end_user/documents/129_Brussels/wg11/w19088.zip w19088_d10_clean.pdf [retrieved on—Apr. 20, 2020].

Chen J., et al., "Higher Granularity Of Quantization Parameter Scaling And Adaptive Delta QP signaling", Samsung Electronics, Joint Collaborative Team on Video Coding (JCT-VC) of ITU-T SG16 WP3 and ISO/IEC JTC1/SC29/WG11, 6th Meeting: Torino, IT, JCTVC-F495, Jul. 14-22, 2011, pp. 1-6.

Flynn D., et al., "CE13.29 Report on Geometry Quantisation", Coding of Moving Pictures and Audio, ISO/IEC JCTC1/SC29/WG11 MPEG/m53389, Apr. 2020, pp. 1-9.

Flynn D., et al., "G-PCC: Integer Step Sizes for In-tree Geometry Quantisation", Coding of Moving Pictures and Audio, ISO/IEC JCTC1/SC29/WG11 MPEG/m52522, Jan. 2020, Brussels, Belgium, pp. 1-4.

Hoang D., "Flexible Scaling of Quantization Parameter", JCTVC-C135-r1, Joint Collaborative Team on Video Coding (JCT-VC) of Itu-T SG16 WP3 and ISO/IEC JTC1/SC29/WG11, WG11 No. m18159, 3rd Meeting: Guangzhou, CN, Oct. 7-15, 2010, pp. 1-5.

Kuma S., et al., "[G-PCC] Confirmation Report on Interaction Between Geometry Scaling and Scalable Lifting" ISO/IEC JTC1/SC29/WG11/m54598, Jun. 2020, 3 Pages.

Ramasubramonian A.K., et al., "[G-PCC] CE13.29 Report on Geometry Quantization QP Control", Coding of Moving Pictures and Audio, ISO/IEC JTC1/SC29/WG11 MPEG2020/M54610, Jun. 2020, 12 Pages.

* cited by examiner

SCALE FACTOR FOR QUANTIZATION PARAMETER VALUES IN GEOMETRY-BASED POINT CLOUD COMPRESSION

This application claims the benefit of U.S. Provisional Application No. 63/043,666, filed Jun. 24, 2020, the entire content of which is incorporated by reference herein.

TECHNICAL FIELD

This disclosure relates to point cloud encoding and decoding.

BACKGROUND

A point cloud is a collection of points in a 3-dimensional space. The points may correspond to points on objects within the 3-dimensional space. Thus, a point cloud may be used to represent the physical content of the 3-dimensional space. Point clouds may have utility in a wide variety of situations. For example, point clouds may be used in the context of autonomous vehicles for representing the positions of objects on a roadway. In another example, point clouds may be used in the context of representing the physical content of an environment for purposes of positioning virtual objects in an augmented reality (AR) or mixed reality (MR) application. Point cloud compression is a process for encoding and decoding point clouds. Encoding point clouds may reduce the amount of data required for storage and transmission of point clouds.

SUMMARY

In general, this disclosure describes methods and devices that improve the quantization and scaling of geometry-based point clouds. In particular, this disclosure describes techniques for quantization parameter (QP) selection and signaling that allows for multiple levels of granularity for the quantization performed at an encoder and the reciprocal scaling function performed at a decoder. In this way, the quantization and scaling processes performed by an encoder/decoder pair may be more adapted to the content being coded, thus improving coding efficiency. The adaptation of the QP and the reciprocal scaling factor to the content being coded may be particularly beneficial to point clouds, where certain regions of a point cloud may be substantially more dense (e.g., include more points) than other regions of the point cloud.

In one example, this disclosure describes a method of encoding a point cloud, the method comprising determining a quantization parameter (QP) value based on a parameter value k, wherein the parameter value k specifies a number of QP points per doubling of a scaling step size to be used at a decoder, encoding the point cloud using the QP value, encoding one or more syntax elements that indicate the QP value, and encoding a syntax element that indicates the parameter value k.

In another example, this disclosure describes an apparatus configured to encode a point cloud, the apparatus comprising a memory configured to store the point cloud, and one or more processors implemented in circuitry and in communication with the memory, the one or more processors configured to determine a QP value based on a parameter value k, wherein the parameter value k specifies a number of QP points per doubling of a scaling step size to be used at a decoder, encode the point cloud using the QP value, encode one or more syntax elements that indicate the QP value, and encode a syntax element that indicates the parameter value k.

In another example, this disclosure describes an apparatus configured to encode a point cloud, the apparatus comprising means for determining a QP value based on a parameter value k, wherein the parameter value k specifies a number of QP points per doubling of a scaling step size to be used at a decoder, means for encoding the point cloud using the QP value, means for encoding one or more syntax elements that indicate the QP value, and means for encoding a syntax element that indicates the parameter value k.

In another example, this disclosure describes a non-transitory computer-readable storage medium storing instructions that, when executed, cause one or more processors of a device configured to encode a point cloud to determine a QP value based on a parameter value k, wherein the parameter value k specifies a number of QP points per doubling of a scaling step size to be used at a decoder, encode the point cloud using the QP value, encode one or more syntax elements that indicate the QP value, and encode a syntax element that indicates the parameter value k.

In another example, this disclosure describes a method of decoding a point cloud, the method comprising decoding one or more syntax elements that indicate a QP value, decoding a syntax element that indicates a parameter value k, wherein the parameter value k specifies a number of QP points per doubling of a scaling step size, determining the scaling step size based on the QP value and the parameter value k, and decoding the point cloud using the determined scaling step size.

In another example, this disclosure describes an apparatus configured to decode a point cloud, the apparatus comprising a memory configured to store the point cloud, and one or more processors implemented in circuitry and in communication with the memory, the one or more processors configured to decode one or more syntax elements that indicate a QP value, decode a syntax element that indicates a parameter value k, wherein the parameter value k specifies a number of QP points per doubling of a scaling step size, determine the scaling step size based on the QP value and the parameter value k, and decode the point cloud using the determined scaling step size.

In another example, this disclosure describes an apparatus configured to decode a point cloud, the apparatus comprising means for decoding one or more syntax elements that indicate a QP value, means for decoding a syntax element that indicates a parameter value k, wherein the parameter value k specifies a number of QP points per doubling of a scaling step size, means for determining the scaling step size based on the QP value and the parameter value k, and means for decoding the point cloud using the determined scaling step size.

In another example, this disclosure describes a non-transitory computer-readable storage medium storing instructions that, when executed, cause one or more processors of a device configured to decode a point cloud to decode one or more syntax elements that indicate a QP value, decode a syntax element that indicates a parameter value k, wherein the parameter value k specifies a number of QP points per doubling of a scaling step size, determine the scaling step size based on the QP value and the parameter value k, and decode the point cloud using the determined scaling step size.

The details of one or more examples are set forth in the accompanying drawings and the description below. Other features, objects, and advantages will be apparent from the description, drawings, and claims.

DETAILED DESCRIPTION

In general, this disclosure describes methods and devices that improve the quantization and scaling of geometry-based point clouds. In particular, this disclosure describes techniques for quantization parameter (QP) selection and signaling that allows for multiple levels of granularity for the quantization performed at an encoder and the reciprocal scaling function performed at a decoder. In this way, the quantization and scaling processes performed by an encoder/decoder pair may be more adapted to the content being coded, thus improving coding efficiency. The adaptation of the QP and the reciprocal scaling factor to the content being coded may be particularly beneficial to point clouds, where certain regions of a point cloud may be substantially more dense (e.g., include more points) than other regions of the point cloud.

Figure 1:
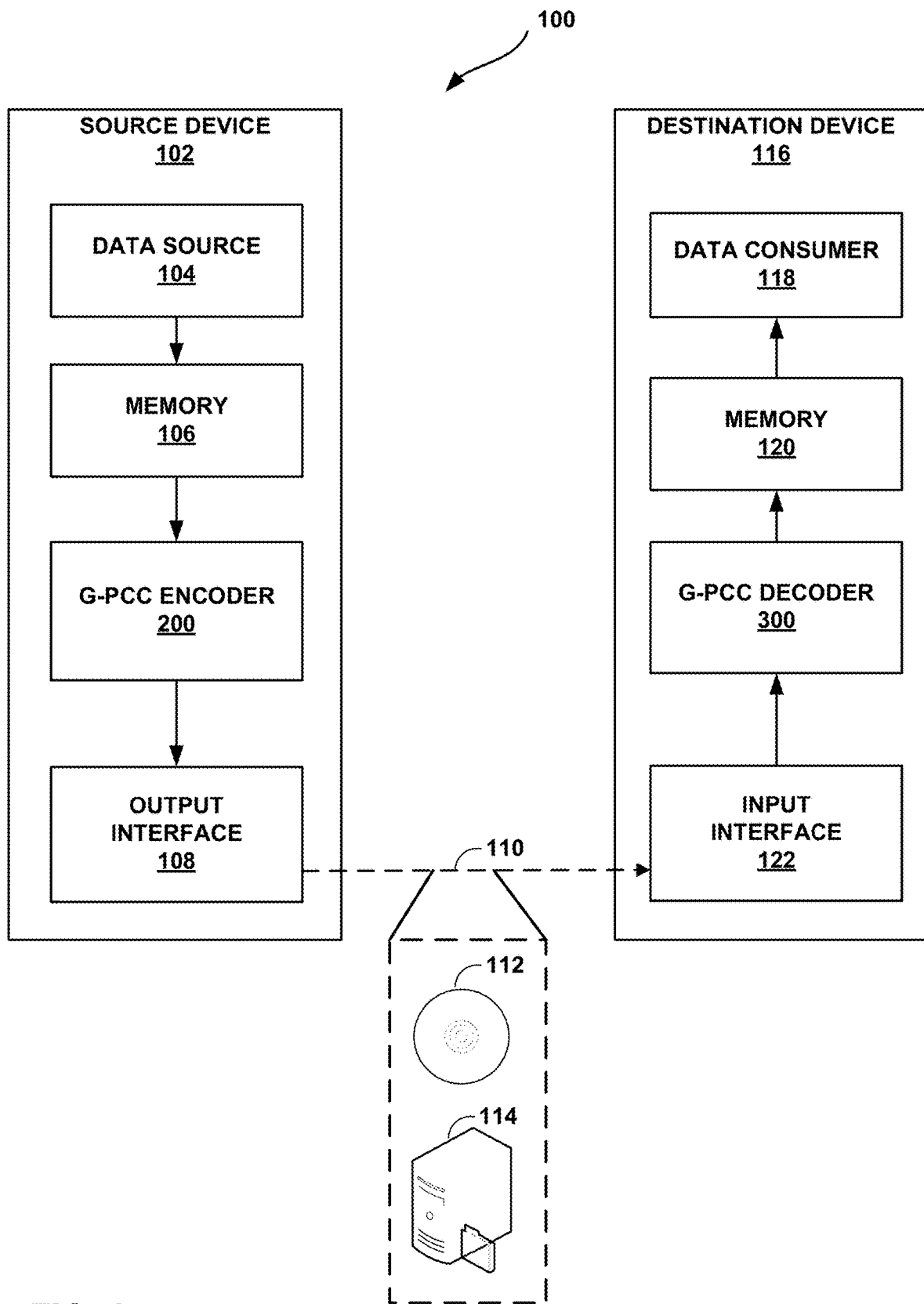
FIG. 1 is a block diagram illustrating an example encoding and decoding system that may perform the techniques of this disclosure.

FIG. 1 is a block diagram illustrating an example encoding and decoding system 100 that may perform the techniques of this disclosure. The techniques of this disclosure are generally directed to coding (encoding and/or decoding) point cloud data, i.e., to support point cloud compression. In general, point cloud data includes any data for processing a point cloud. The coding may be effective in compressing and/or decompressing point cloud data.

As shown in FIG. 1, system 100 includes a source device 102 and a destination device 116. Source device 102 provides encoded point cloud data to be decoded by a destination device 116. Particularly, in the example of FIG. 1, source device 102 provides the point cloud data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming devices, terrestrial or marine vehicles, spacecraft, aircraft, robots, LIDAR devices, satellites, surveillance or security equipment, or the like. In some cases, source device 102 and destination device 116 may be equipped for wireless communication.

In the example of FIG. 1, source device 102 includes a data source 104, a memory 106, a G-PCC encoder 200, and an output interface 108. Destination device 116 includes an input interface 122, a G-PCC decoder 300, a memory 120, and a data consumer 118. G-PCC encoder 200 of source device 102 and G-PCC decoder 300 of destination device 116 may be configured to apply the techniques of this disclosure related to scale factors for quantization parameters in geometry-based point cloud compression. Thus, source device 102 represents an example of an encoding device, while destination device 116 represents an example of a decoding device. In other examples, source device 102 and destination device 116 may include other components or arrangements. For example, source device 102 may receive data (e.g., point cloud data) from an internal or external source. Likewise, destination device 116 may interface with an external data consumer, rather than include a data consumer in the same device.

System 100 as shown in FIG. 1 is merely one example. In general, other digital encoding and/or decoding devices may perform the techniques of this disclosure related to scale factors for quantization parameters in geometry-based point cloud compression. Source device 102 and destination device 116 are merely examples of such devices in which source device 102 generates coded data for transmission to destination device 116. This disclosure refers to a "coding" device as a device that performs coding (encoding and/or decoding) of data. Thus, G-PCC encoder 200 and G-PCC decoder 300 represent examples of coding devices, in particular, an encoder and a decoder, respectively. Similarly, the term "coding" may refer to either of encoding or decoding. In some examples, source device 102 and destination device 116 may operate in a substantially symmetrical manner such that each of source device 102 and destination device 116 includes encoding and decoding components. Hence, system 100 may support one-way or two-way transmission between source device 102 and destination device 116, e.g., for streaming, playback, broadcasting, telephony, navigation, and other applications.

In general, data source 104 represents a source of data (i.e., raw, unencoded point cloud data) and may provide a sequential series of "frames") of the data to G-PCC encoder 200, which encodes data for the frames. Data source 104 of source device 102 may include a point cloud capture device, such as any of a variety of cameras or sensors, e.g., a 3D scanner or a light detection and ranging (LIDAR) device, one or more video cameras, an archive containing previously captured data, and/or a data feed interface to receive data from a data content provider. In this way, data source 104 may generate a point cloud. Alternatively or additionally, point cloud data may be computer-generated from scanner, camera, sensor or other data. For example, data source 104 may generate computer graphics-based data as the source data, or produce a combination of live data, archived data, and computer-generated data. In each case, G-PCC encoder 200 encodes the captured, pre-captured, or computer-generated data. G-PCC encoder 200 may rearrange the frames from the received order (sometimes referred to as "display order") into a coding order for coding. G-PCC encoder 200 may generate one or more bitstreams including encoded data. Source device 102 may then output the encoded data via output interface 108 onto computer-readable medium 110 for reception and/or retrieval by, e.g., input interface 122 of destination device 116.

Memory 106 of source device 102 and memory 120 of destination device 116 may represent general purpose memories. In some examples, memory 106 and memory 120 may store raw data, e.g., raw data from data source 104 and raw, decoded data from G-PCC decoder 300. Additionally or alternatively, memory 106 and memory 120 may store software instructions executable by, e.g., G-PCC encoder 200 and G-PCC decoder 300, respectively. Although memory 106 and memory 120 are shown separately from G-PCC encoder 200 and G-PCC decoder 300 in this example, it should be understood that G-PCC encoder 200 and G-PCC decoder 300 may also include internal memories for functionally similar or equivalent purposes. Furthermore, memory 106 and memory 120 may store encoded data, e.g., output from G-PCC encoder 200 and input to G-PCC decoder 300. In some examples, portions of memory 106 and memory 120 may be allocated as one or more buffers, e.g., to store raw, decoded, and/or encoded data. For instance, memory 106 and memory 120 may store data representing a point cloud. In other words, memory 106 and memory 120 may be configured to store point cloud data.

Computer-readable medium 110 may represent any type of medium or device capable of transporting the encoded data from source device 102 to destination device 116. In one example, computer-readable medium 110 represents a communication medium to enable source device 102 to transmit encoded data (e.g., encoded point cloud) directly to destination device 116 in real-time, e.g., via a radio frequency network or computer-based network. Output interface 108 may modulate a transmission signal including the encoded data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded data.

In some examples, source device 102 may output encoded data to file server 114 or another intermediate storage device that may store the encoded data generated by source device 102. Destination device 116 may access stored data from file server 114 via streaming or download. File server 114 may be any type of server device capable of storing encoded data and transmitting that encoded data to the destination device 116. File server 114 may represent a web server (e.g., for a web site), a File Transfer Protocol (FTP) server, a content delivery network device, or a network attached storage (NAS) device. Destination device 116 may access encoded data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to G-PCC encoder 200 and/or output interface 108, and destination device 116 may include an SoC device to perform the functionality attributed to G-PCC decoder 300 and/or input interface 122.

The techniques of this disclosure may be applied to encoding and decoding in support of any of a variety of applications, such as communication between autonomous vehicles, communication between scanners, cameras, sensors and processing devices such as local or remote servers, geographic mapping, or other applications.

In some examples, source device 102 and/or destination device 116 are mobile devices, such as mobile phones, augmented reality (AR) devices, or mixed reality (MR) devices. In such examples, source device 102 may generate and encode a point cloud as part of a process to map the local environment of source device 102. With respect to AR and MR examples, destination device 116 may use the point cloud to generate a virtual environment based on the local environment of source device 102. In some examples, source device 102 and/or destination device 116 are terrestrial or marine vehicles, spacecraft, or aircraft. In such examples, source device 102 may generate and encode a point cloud as part of a process to map an environment of the source device, e.g., for purposes of autonomous navigation, crash forensics, and other purposes.

Input interface 122 of destination device 116 receives an encoded bitstream from computer-readable medium 110 (e.g., a communication medium, storage device 112, file server 114, or the like). The encoded bitstream may include signaling information defined by G-PCC encoder 200, which is also used by G-PCC decoder 300, such as syntax elements having values that describe characteristics and/or processing of coded units (e.g., slices, pictures, groups of pictures, sequences, or the like). Data consumer 118 uses the decoded data. For example, data consumer 118 may use the decoded data to determine the locations of physical objects. In some examples, data consumer 118 may comprise a display to present imagery based on a point cloud. For example, data consumer 118 may use points of the point cloud as vertices of polygons and may use color attributes of points of the point cloud to shade the polygons. In this example, data consumer 118 may then rasterize the polygons to present computer-generated images based on the shaded polygons.

G-PCC encoder 200 and G-PCC decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of G-PCC encoder 200 and G-PCC decoder 300 may be included in one or more encoders or decoders, either of which may be integrated as part of a combined encoder/decoder (CODEC) in a respective device. A device including G-PCC encoder 200 and/or G-PCC decoder 300 may comprise one or more integrated circuits, microprocessors, and/or other types of devices.

G-PCC encoder 200 and G-PCC decoder 300 may operate according to a coding standard, such as video point cloud compression (V-PCC) standard or a geometry point cloud compression (G-PCC) standard. This disclosure may generally refer to coding (e.g., encoding and decoding) of pictures to include the process of encoding or decoding data. An encoded bitstream generally includes a series of values for syntax elements representative of coding decisions (e.g., coding modes).

This disclosure may generally refer to "signaling" certain information, such as syntax elements. The term "signaling" may generally refer to the communication of values for syntax elements and/or other data used to decode encoded data. That is, G-PCC encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

ISO/IEC MPEG (JTC 1/SC 29/WG 11) is studying the potential need for standardization of point cloud coding technology with a compression capability that significantly exceeds that of the current approaches and will target to create the standard. The group is working together on this exploration activity in a collaborative effort known as the 3-Dimensional Graphics Team (3DG) to evaluate compression technology designs proposed by their experts in this area.

Point cloud compression activities are categorized in two different approaches. The first approach is "Video point cloud compression" (V-PCC), which segments the 3D object, and projects the segments in multiple 2D planes (which are represented as "patches" in the 2D frame), which are further coded by a legacy 2D video codec such as a High Efficiency Video Coding (HEVC) (ITU-T H.265) codec. The second approach is "Geometry-based point cloud compression" (G-PCC), which directly compresses 3D geometry, i.e., position of a set of points in 3D space, and associated attribute values (for each point associated with the 3D geometry). G-PCC addresses the compression of point clouds in both Category 1 (static point clouds) and Category 3 (dynamically acquired point clouds). A recent draft of the G-PCC standard is available in G-PCC DIS, ISO/IEC JTC1/SC29/WG11 w19088, Brussels, Belgium, January 2020 (hereinafter, "w19088"), and a description of the codec is available in G-PCC Codec Description v6, ISO/IEC JTC1/SC29/WG11 w19091, Brussels, Belgium, January 2020 (hereinafter, "w19091").

A point cloud contains a set of points in a 3D space and may have attributes associated with the points. The attributes may be color information such as R, G, B or Y, Cb, Cr, or reflectance information, or other attributes. Point clouds may be captured by a variety of cameras or sensors such as LIDAR sensors and 3D scanners and may also be computer-generated. Point cloud data are used in a variety of applications including, but not limited to, construction (modeling), graphics (3D models for visualizing and animation), the automotive industry (LIDAR sensors used to help in navigation), in mobile phones, in tablet computers, and in other scenarios.

The 3D space occupied by a point cloud data may be enclosed by a virtual bounding box. The position of the points in the bounding box may be represented by a certain precision; therefore, the positions of one or more points may be quantized based on the precision. At the smallest level, the bounding box is split into voxels which are the smallest unit of space represented by a unit cube. A voxel in the bounding box may be associated with zero, one, or more than one point. The bounding box may be split into multiple cube/cuboid regions, which may be called tiles. Each tile may be coded into one or more slices. The partitioning of the bounding box into slices and tiles may be based on the number of points in each partition, or based on other considerations (e.g., a particular region may be coded as tiles). The slice regions may be further partitioned using splitting decisions similar to those in video codecs.

Figure 2:
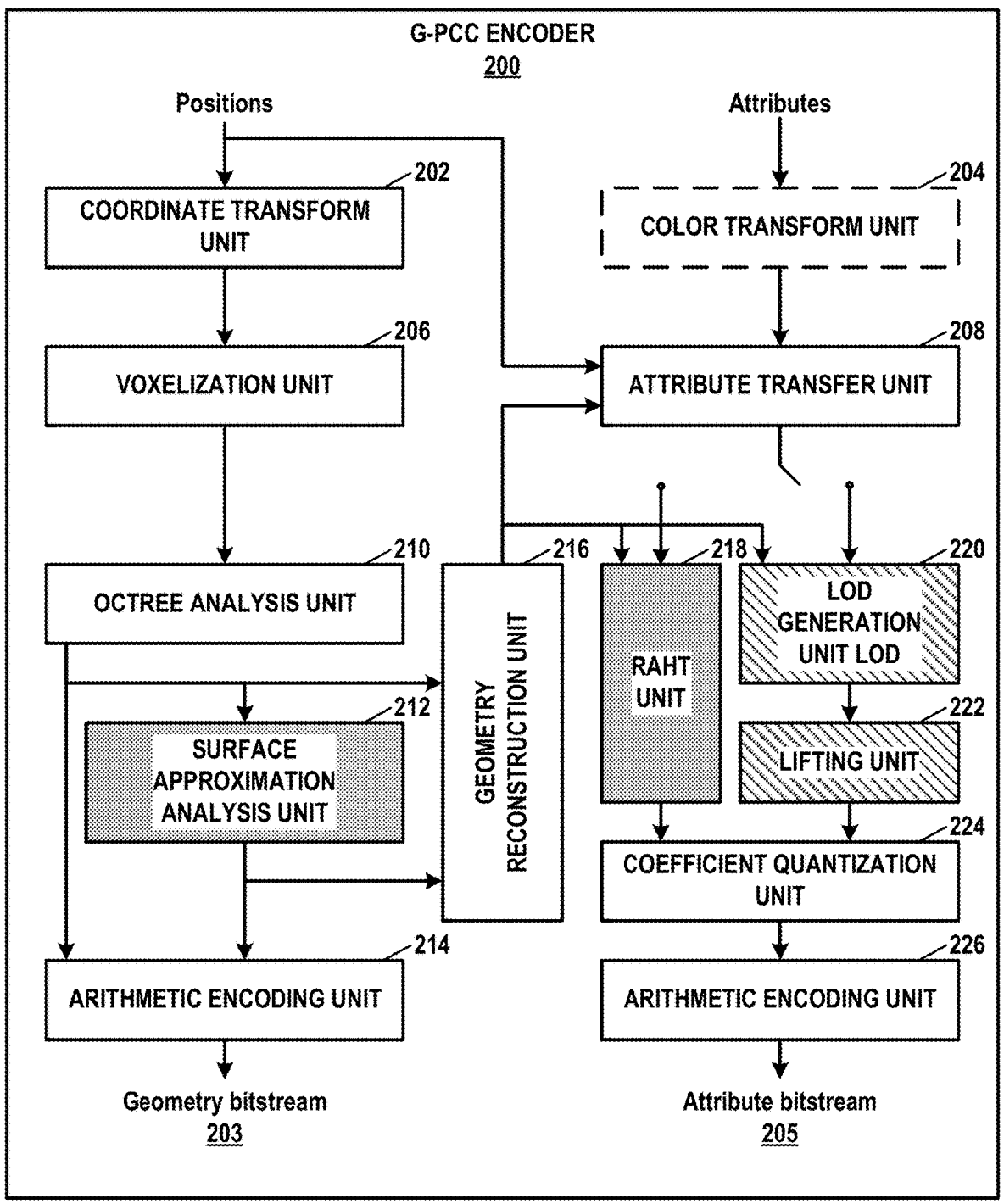
FIG. 2 is a block diagram illustrating an example Geometry Point Cloud Compression (G-PCC) encoder.
Figure 3:
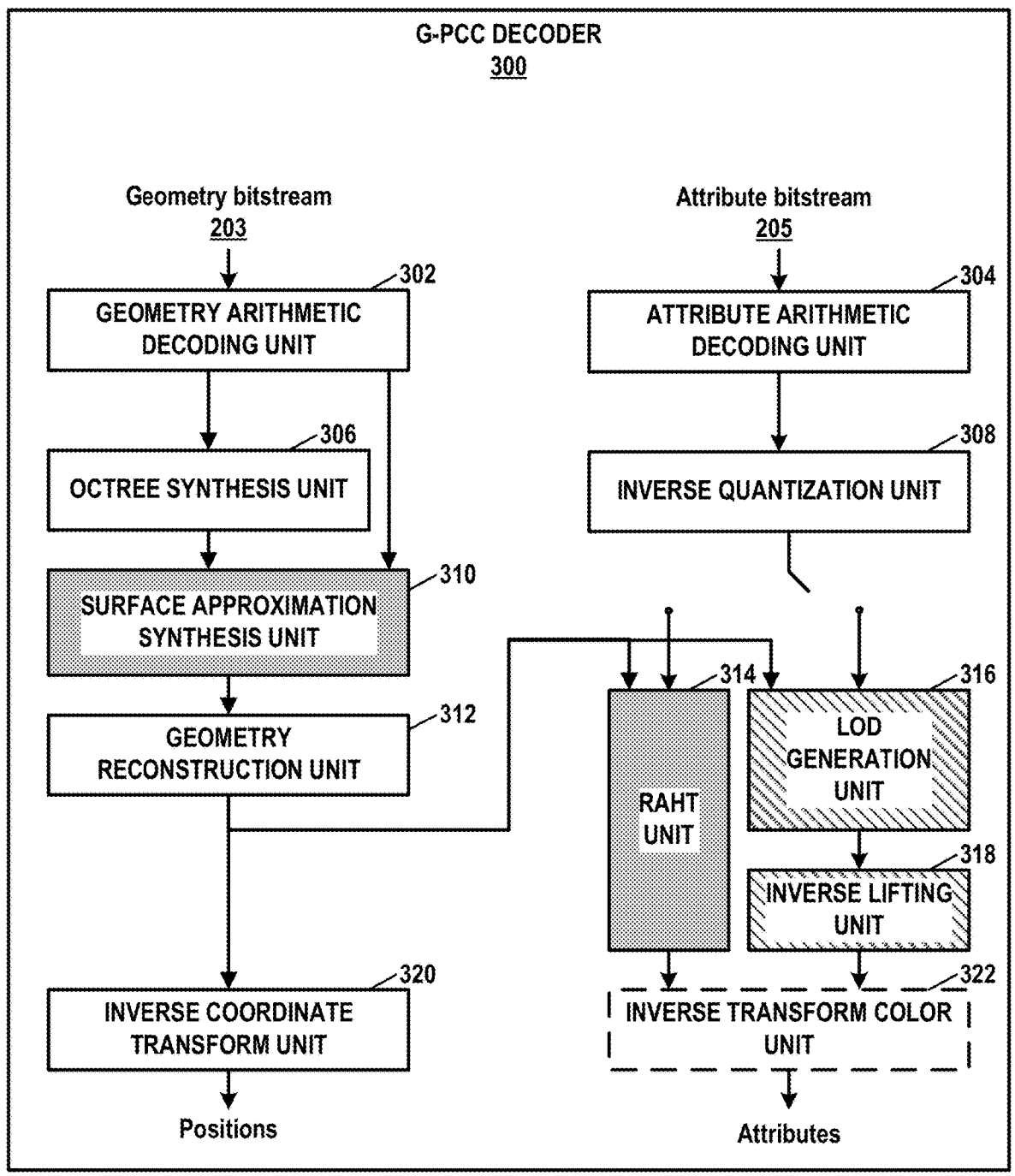
FIG. 3 is a block diagram illustrating an example G-PCC decoder.

FIG. 2 provides an overview of G-PCC encoder 200. FIG. 3 provides an overview of G-PCC decoder 300. The modules shown are logical, and do not necessarily correspond one-to-one to implemented code in the reference implementation of G-PCC codec, i.e., TMC13 test model software studied by ISO/IEC MPEG (JTC 1/SC 29/WG 11).

In both G-PCC encoder 200 and G-PCC decoder 300, point cloud positions are coded first. Attribute coding depends on the decoded geometry. In FIG. 2 and FIG. 3, the gray-shaded modules are options typically used for Category 1 data. Diagonal-crosshatched modules are options typically used for Category 3 data. All the other modules are common between Categories 1 and 3.

For Category 3 data, the compressed geometry is typically represented as an octree from the root all the way down to a leaf level of individual voxels. For Category 1 data, the compressed geometry is typically represented by a pruned octree (i.e., an octree from the root down to a leaf level of blocks larger than voxels) plus a model that approximates the surface within each leaf of the pruned octree. In this way, both Category 1 and 3 data share the octree coding mechanism, while Category 1 data may in addition approximate the voxels within each leaf with a surface model. The surface model used is a triangulation comprising 1-10 triangles per block, resulting in a triangle soup. The Category 1 geometry codec is therefore known as the Trisoup geometry codec, while the Category 3 geometry codec is known as the Octree geometry codec.

At each node of an octree, an occupancy is signaled (when not inferred) for one or more of its child nodes (up to eight nodes). Multiple neighborhoods are specified including (a) nodes that share a face with a current octree node, (b) nodes that share a face, edge or a vertex with the current octree node, etc. Within each neighborhood, the occupancy of a node and/or its children may be used to predict the occupancy of the current node or its children. For points that are sparsely populated in certain nodes of the octree, the codec (e.g., as implemented by G-PCC encoder 200 and G-PCC decoder 300) also supports a direct coding mode where the 3D position of the point is encoded directly. A flag may be signaled to indicate that a direct mode is signaled. At the lowest level, the number of points associated with the octree node/leaf node may also be coded.

Once the geometry is coded, the attributes corresponding to the geometry points are coded. When there are multiple attribute points corresponding to one reconstructed/decoded geometry point, an attribute value may be derived that is representative of the reconstructed point.

There are three attribute coding methods in G-PCC: Region Adaptive Hierarchical Transform (RAHT) coding, interpolation-based hierarchical nearest-neighbour prediction (Predicting Transform), and interpolation-based hierarchical nearest-neighbor prediction with an update/lifting step (Lifting Transform). RAHT and Lifting are typically used for Category 1 data, while Predicting is typically used for Category 3 data. However, either method may be used for any data, and, similar with the geometry codecs in G-PCC, the attribute coding method used to code the point cloud is specified in the bitstream.

The coding of the attributes may be conducted in a level-of-detail (LoD), where for each level of detail, a finer representation of the point cloud attribute may be obtained. Each level of detail may be specified based on a distance metric from the neighboring nodes or based on a sampling distance.

At G-PCC encoder 200, the residuals obtained as the output of the coding methods for the attributes are quantized. The quantized residuals may be coded using context adaptive arithmetic coding.

In the example of FIG. 2, G-PCC encoder 200 may include a coordinate transform unit 202, a color transform unit 204, a voxelization unit 206, an attribute transfer unit 208, an octree analysis unit 210, a surface approximation analysis unit 212, an arithmetic encoding unit 214, a geometry reconstruction unit 216, an RAHT unit 218, a LOD generation unit 220, a lifting unit 222, a coefficient quantization unit 224, and an arithmetic encoding unit 226.

As shown in the example of FIG. 2, G-PCC encoder 200 may receive a set of positions of points of the point cloud and a set of attributes. G-PCC encoder 200 may obtain the set of positions of the points of the point cloud and the set of attributes from data source 104 (FIG. 1). The positions may include coordinates of points of a point cloud. The attributes may include information about the points of the point cloud, such as colors associated with points of the point cloud. G-PCC encoder 200 may generate a geometry bitstream 203 that includes an encoded representation of the positions of the points of the point cloud. G-PCC encoder 200 may also generate an attribute bitstream 205 that includes an encoded representation of the set of attributes.

Coordinate transform unit 202 may apply a transform to the coordinates of the points to transform the coordinates from an initial domain to a transform domain. This disclosure may refer to the transformed coordinates as transform coordinates. Color transform unit 204 may apply a transform in order to transform color information of the attributes to a different domain. For example, color transform unit 204 may transform color information from an RGB color space to a YCbCr color space.

Furthermore, in the example of FIG. 2, voxelization unit 206 may voxelize the transform coordinates. Voxelization of the transform coordinates may include quantization and removing some points of the point cloud. In other words, multiple points of the point cloud may be subsumed within a single "voxel," which may thereafter be treated in some respects as one point. Furthermore, octree analysis unit 210 may generate an octree based on the voxelized transform coordinates. Additionally, in the example of FIG. 2, surface approximation analysis unit 212 may analyze the points to potentially determine a surface representation of sets of the points. Arithmetic encoding unit 214 may entropy encode syntax elements representing the information of the octree and/or surfaces determined by surface approximation analysis unit 212. G-PCC encoder 200 may output these syntax elements in geometry bitstream 203. Geometry bitstream 203 may also include other syntax elements, including syntax elements that are not arithmetically encoded.

Geometry reconstruction unit 216 may reconstruct transform coordinates of points of the point cloud based on the octree, data indicating the surfaces determined by surface approximation analysis unit 212, and/or other information. The number of transform coordinates reconstructed by geometry reconstruction unit 216 may be different from the original number of points of the point cloud because of voxelization and surface approximation. This disclosure may refer to the resulting points as reconstructed points. Attribute transfer unit 208 may transfer attributes of the original points of the point cloud to reconstructed points of the point cloud.

Furthermore, RAHT unit 218 may apply RAHT coding to the attributes of the reconstructed points. Alternatively or additionally, LOD generation unit 220 and lifting unit 222 may apply LOD processing and lifting, respectively, to the attributes of the reconstructed points. RAHT unit 218 and lifting unit 222 may generate coefficients based on the attributes. Coefficient quantization unit 224 may quantize the coefficients generated by RAHT unit 218 or lifting unit 222. Arithmetic encoding unit 226 may apply arithmetic coding to syntax elements representing the quantized coefficients. G-PCC encoder 200 may output these syntax elements in attribute bitstream 205. Attribute bitstream 205 may also include other syntax elements, including non-arithmetically encoded syntax elements.

As will be explained in more detail below, G-PCC encoder 200 is an example of a device configured to perform the quantization and/or scaling techniques of this disclosure. In one example, G-PCC encoder 200 may be configured to determine a quantization parameter (QP) value based on a parameter value k, wherein the parameter value k specifies a number of QP points per doubling of a scaling step size to be used at a decoder, encode a point cloud using the QP value, encode one or more syntax elements that indicate the QP value, and encode a syntax element that indicates the parameter value k In the example of FIG. 3, G-PCC decoder 300 may include a geometry arithmetic decoding unit 302, an attribute arithmetic decoding unit 304, an octree synthesis unit 306, an inverse quantization unit 308, a surface approximation synthesis unit 310, a geometry reconstruction unit 312, a RAHT unit 314, a LOD generation unit 316, an inverse lifting unit 318, an inverse transform coordinate unit 320, and an inverse transform color unit 322.

G-PCC decoder 300 may obtain geometry bitstream 203 and attribute bitstream 205. Geometry arithmetic decoding unit 302 of decoder 300 may apply arithmetic decoding (e.g., Context-Adaptive Binary Arithmetic Coding (CABAC) or other type of arithmetic decoding) to syntax elements in the geometry bitstream. Similarly, attribute arithmetic decoding unit 304 may apply arithmetic decoding to syntax elements in the attribute bitstream.

Octree synthesis unit 306 may synthesize an octree based on syntax elements parsed from the geometry bitstream. In instances where surface approximation is used in the geometry bitstream, surface approximation synthesis unit 310 may determine a surface model based on syntax elements parsed from the geometry bitstream and based on the octree.

Furthermore, geometry reconstruction unit 312 may perform a reconstruction to determine coordinates of points of a point cloud. Inverse transform coordinate unit 320 may apply an inverse transform to the reconstructed coordinates to convert the reconstructed coordinates (positions) of the points of the point cloud from a transform domain back into an initial domain.

Additionally, in the example of FIG. 3, inverse quantization unit 308 may inverse quantize attribute values. The attribute values may be based on syntax elements obtained from the attribute bitstream (e.g., including syntax elements decoded by attribute arithmetic decoding unit 304).

Depending on how the attribute values are encoded, RAHT unit 314 may perform RAHT coding to determine, based on the inverse quantized attribute values, color values for points of the point cloud. Alternatively, LOD generation unit 316 and inverse lifting unit 318 may determine color values for points of the point cloud using a level of detail-based technique.

Furthermore, in the example of FIG. 3, inverse transform color unit 322 may apply an inverse color transform to the color values. The inverse color transform may be an inverse of a color transform applied by color transform unit 204 of encoder 200. For example, color transform unit 204 may transform color information from an RGB color space to a YCbCr color space. Accordingly, inverse color transform unit 322 may transform color information from the YCbCr color space to the RGB color space.

As will be explained in more detail below, G-PCC decoder 300 is an example of a device configured to perform the quantization and/or scaling techniques of this disclosure. In one example, G-PCC decoder 300 may be configured to decode one or more syntax elements that indicate a QP value, decode a syntax element that indicates a parameter value k, wherein the parameter value k specifies a number of QP points per doubling of a scaling step size, determine the scaling step size based on the QP value and the parameter value k, and decode the point cloud using the determined scaling step size.

The various units of FIG. 2 and FIG. 3 are illustrated to assist with understanding the operations performed by encoder 200 and decoder 300. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Non-Normative Quantization and Scaling

In some examples, an original point cloud may be represented in a floating point format or at a very high bitdepth. The input point cloud is quantized and voxelized at a certain bitdepth, denoted by voxelization unit 206 of G-PCC encoder 200 in FIG. 2. A quantization may be applied at G-PCC encoder 200 in voxelization unit 206 for the purpose of voxelization, and a scaling may be performed at G-PCC decoder 300, mainly for the mapping of the decoded point cloud (i.e., in voxel units), in application specific physical space (i.e., in physical dimension). A scale value that may be used by G-PCC decoder 300 for this operation is signalled using the syntax elements sps_source_scale_factor_numerator_minus1 and sps_source_scale_factor_denominator_minus1.

The quantization process being a pre-processing step (prior to encoding), and the scaling process being a post-processing step (after decoding), does not impact the overall coding process. That is, the quantization and scaling are non-normative in nature. This operation outside of the coding process is roughly similar to spatial downsampling to a lower spatial resolution for compression followed by upsampling prior to display with traditional 2D video frames. In this traditional 2D video case, the down and upsampling are non-normative and do not impact the coding process. Syntax elements that indicate the signaled scale factor numerator (sps_source_scale_factor_numerator_minus1) and denominator (sps_source_scale_factor_denominator_minus1) are shown in the table below.

| | |
|---|---|
| sps_source_scale_factor_numerator_minus1 | ue(v) |
| sps_source_scale_factor_denominator_minus1 | ue(v) |

Normative Quantization and Scaling in G-PCC

The Quantization/Scaling of geometry coordinates/positions within the codec, or geometry scaling as it is referred to in G-PCC, is controlled by a flag in the geometry parameter set (GPS) and a quantization parameter (QP) value. The QP value may be specified/modified in multiple levels of a syntax structure. The syntax elements associated with geometry scaling in the various parts of the syntax are described below.

| Geometry Parameter Set (GPS) | |
|---|---|
| | Descriptor |
| geometry_parameter_set( ) { | |
|   gps_geom_parameter_set_id | ue(v) |
|   ... | ue(v) |
|   geom_scaling_enabled_flag | u(1) |
|   if( geom_scaling_enabled_flag ) | |
|     geom_base_qp | ue(v) |
|   ... | u(1) |
| } | |

The syntax element geom_scaling_enabled_flag enables the geometry coordinates to be scaled at G-PCC decoder 300, and geom_base_qp is used to derive the scale value used in the process.

| Geometry Slice Header (GSH) | |
|---|---|
| | Descriptor |
| geometry_slice_header( ) { | |
|   gsh_geometry_parameter_set_id | ue(v) |
|   ... | |
|   if( geom_scaling_enabled_flag ) { | |
|     geom_slice_qp_offset | se(v) |
|     geom_octree_qp_offsets_enabled_flag | u(1) |
|     if( geom_octree_qp_offsets_enabled_flag ) | |
|       geom_octree_qp_offsets_depth | ue(v) |
|   } | |
|   byte_alignment( ) | |
| } | |

In the geometry slice header (GSH), G-PCC encoder 200 may signal a QP offset that is used to modify the scale value used for points belonging to the slice. The GSH also includes a flag, (geom_octree_qp_offsets_enabled_flag) that controls whether QP offset control is enabled in lower octree levels. If yes, G-PCC encoder 200 also signals the depth (geom_octree_qp_offsets_depth) at which the QP parameter is specified.

| Geometry Node | |
|---|---|
| | Descriptor |
| geometry_node( depthX, depthY, depthZ, partitionSkip, nodeIdx, | |
| xN, yN, zN ) { | |
|   if( depth = = GeomScalingDepth && | |
| geom_octree_qp_offsets_enabled_flag) { | |
|     geom_node_qp_offset_eq0_flag | ae(v) |
|     if( !geom_node_qp_offset_eq0_flag) { | |
|       geom_node_qp_offset_sign_flag | ae(v) |
|       geom_node_qp_offset_abs_minus1 | ae(v) |
|     } | |
|   } | |
|   ... | |
| } | |

When the current octree depth is equal to GeomScalingDepth, as derived from geom_octree_qp_offsets_depth, G-PCC decoder 300 may apply a QP offset for the points belonging to that node. GeomScalingDepth, derived from a syntax element signaled in the bitstream, refers to the depth at which geometry scaling is applied. As the octree is coded from the root node towards the leaf nodes, the depth increases. With each depth increase, more bits of the positions of the occupied nodes/leaf nodes are coded. When the depth reaches GeomScalingDepth, all the subsequent bits are quantized, and the octree coding process continues with the quantized bits. This applies to all nodes that are at depth equal to GeomScalingDepth.

Geometry Quantization Parameter Derivation Process

G-PCC encoder 200 and G-PCC decoder 300 determine the QP value for the geometry scale factor depending on the node that is being processed. The scaling process modifies the effective node size of the child nodes, and this is determined by the process described below. In this process, when the depth of the octree node is less than GeomScalingDepth, the coordinates or the bits are coded in a lossless mode (e.g., QP equal to 4). When the depth is equal to GeomScalingDepth, the QP is set to be equal to the sum of the base QP (geom_base_qp), a slice QP offset (geom_slice_qp_offset) and a node QP offset (nodeQpOffset). For depths larger than GeomScalingDepth, the QP is set equal to the QP of the parent tree depth (which is the same as the QP at GeomScalingDepth). An example process for the geometry QP derivation from G-PCC is shown below.

The variable NodeQp is derived as follows:

When depth is equal to GeomScalingDepth:

NodeQp=geom_base_qp+geom_slice_qp_offset+nodeQpOffset

When depth is greater than GeomScalingDepth:

NodeQp=NodeQpMap[depth][nodeIdx]

Otherwise, depth is less than GeomScalingDepth, NodeQp is set equal to 4.

The variables EffectiveChildNodeSizeLog2 and EffectiveDepth are derived as follows:

EffectiveChildNodeSizeLog2=ChildNodeSizeLog2−(NodeQp−4)/6

EffectiveDepth=depth+(NodeQp−4)/6

Invocation of Geometry Scaling Process

The geometry scaling process at G-PCC decoder 300 is invoked in Section 8.2.2.2 of the G-PCC standard (an example which is reproduced below), where the geomScale( ) function is used. At each node, the positions corresponding to the child nodes are derived. The number of child nodes is denoted by the variable GeometryNodeChildrenCnt. The value of GeometryNodeChildrenCnt may be at most 8. The index of the child nodes within the GeometryNodeChildrenCnt child nodes are specified using a 3 bit number, and a quantized position of the child node (x, y, z) is derived from the coordinates of the parent node (xN, yN, zN) and childIdx. For each child node, the unquantized (scaled) position PointPos[ ][i] for i=0, 1, 2 are derived using the geomScale( ) function. For nodes that are coded using the direct coding mode (e.g., indicated by direct_mode_flag), the respective scaled positions are obtained from the child node position and the PointOffsetX[ ], PointOffsetY[ ] and PointOffsetZ[ ] values, also using the geomScale( ) function.

8.2.22 Octree Node Decoding Process

The inputs to this process are:

an octree node location (depth, nodeIdx) specifying the position of the current geometry octree node a spatial location (xN, yN, zN) specifying the position of the current geometry octree node in the current slice.

The outputs of this process are the modified array PointPos and the updated variable PointCount.

If both EffectiveDepth is less than MaxGeometryOctreeDepth−1, and direct_mode_flag is equal to 0, no points are output by this process. Otherwise, if either EffectiveDepth is greater than or equal to MaxGeometryOctreeDepth−1, or direct_mode_flag is equal to 1, the remainder of this process generates one or more point positions.

The function geomScale(val, cIdx) is defined as the invocation of the scaling process for a single octree node position component 8.2.2.3 with the position val, the component cIdx, and the variable qP set equal to NodeQp as inputs.

The spatial location of points in each occupied child is determined according to the number of duplicate points in each child and the use of direct coded positions as follows:

The scaling of the node position using the QP is derived using the geomScale( ) function as follows:

```
for( child = 0; child < GeometryNodeChildrenCnt; child++ ) {
    childIdx = GeometryNodeChildren[ child ];
    x = 2 × xN + ( childIdx & 4 ) = = 1 ;
    y = 2 × yN + ( childIdx & 2 ) = = 1 ;
    z = 2 × zN + ( childIdx & 1 ) = = 1 ;
    for( i = 0; i < GeometryNodeDupPoints[ child ] + 1 ; i++, PointCount++ ) {
        PointPos[ PointCount ][ 0 ] = geomScale( x , 0);
        PointPos[ PointCount ][ 1 ] = geomScale( y , 1);
        PointPos[ PointCount ][ 2 ] = geomScale( z , 2);
    }
    if( direct_mode_flag ) {
        if (!duplicated_point_flag) {
            for( i = 0; i <= num_direct_points_minus1; i++, PointCount++ ) {
                PointPos[ PointCount ][ 0 ] = geomScale( ( x <<
EffectiveChildNodeSizeLog2 ) + PointOffsetX[ i ] , 0);
                PointPos[ PointCount ][ 1 ] = geomScale( ( y <<
EffectiveChildNodeSizeLog2 ) + PointOffsetY[ i ] , 1);
                PointPos[ PointCount ][ 2 ] = geomScale( ( z <<
EffectiveChildNodeSizeLog2 ) + PointOffsetZ[ i ] , 2);
            }
        }
        else {
            for( i = 0; i <= num_direct_points_minus1; i++, PointCount++ ) {
                PointPos[ PointCount ][ 0 ] = geomScale( ( x <<
EffectiveChildNodeSizeLog2 ) + PointOffsetX[ 0 ] , 0);
                PointPos[ PointCount ][ 1 ] = geomScale( ( y <<
EffectiveChildNodeSizeLog2 ) + PointOffsetY[ 0 ] , 1);
                PointPos[ PointCount ][ 2 ] = geomScale( ( z <<
EffectiveChildNodeSizeLog2 ) + PointOffsetZ[ 0 ] , 2);
            }
        }
    }
}
```

In the geomScale( ) function, the node position is scaled and the inverse-quantized position value is derived as described below:

8.2.23 Scaling Process for a Single Octree Node Position Component

The inputs to this process are:
a variable val representing an unscaled position component value,
a variable cIdx specifying the position component index,
a variable qP specifying the quantization parameter.

The output of this process is the scaled position component value pos.

(NOTE?) When geom_scaling_enabled_flag is equal to 0, the output of this process is equal to the input value pos.

The variable scalingExpansionLog2 is set equal to (qP−4)/6.

The variables highPart and lowPart representing concatenated parts of the unscaled position component value are derived as follows:

highPart=val>>(ScalingNodeSizeLog2[cIdx]−scalingExpansionLog2)

lowPart=val&((1<<(ScalingNodeSizeLog2[cIdx]−scalingExpansionLog2))−1)

The list geomLevelScale is specified as geomLevelScale[i]={659445, 741374, 831472, 933892, 1048576, 1175576} with i=0 . . . 5.

The output variable pos is derived as follows:

highPartS=highPart<<ScalingNodeSizeLog2[cIdx]

lowPartS=(lowPart*(geomLevelScale[qP % 6]<<(qP/6))+(1<<19))>>20 pos=highPartS|lowPartS

An Alternative Scaling Method

An alternate mechanism to the geometry scaling process was proposed in "G-PCC: Integer step sizes for in-tree geometry quantisation," m52522, D. Flynn, K. Mammou, Brussels, Belgium, January 2020, where the following step sizes were used for the scaling operation.

geomLevelScale[$i$]={1,1.25,1.5,1.75}

The above scaling factors are used as a default scaling mechanism for a G-PCC anchor in one example of G-PCC.

In some cases, scaled versions of the above values may be used for fixed-point implementation (e.g., values 4, 5, 6, 7); a shift and rounding operations may be accompanied to apply the correct scale factor. The QP value of 0 corresponds to the lossless case (scale value 1) and the QP step sizes doubles for every four QP values. The step sizes may be derived as follows, where floor( ) stands for the floor operation:

$$qS=(1/4)*[4+(QP \bmod 4)]*2^{floor(QP/4)}$$

Figure 4:
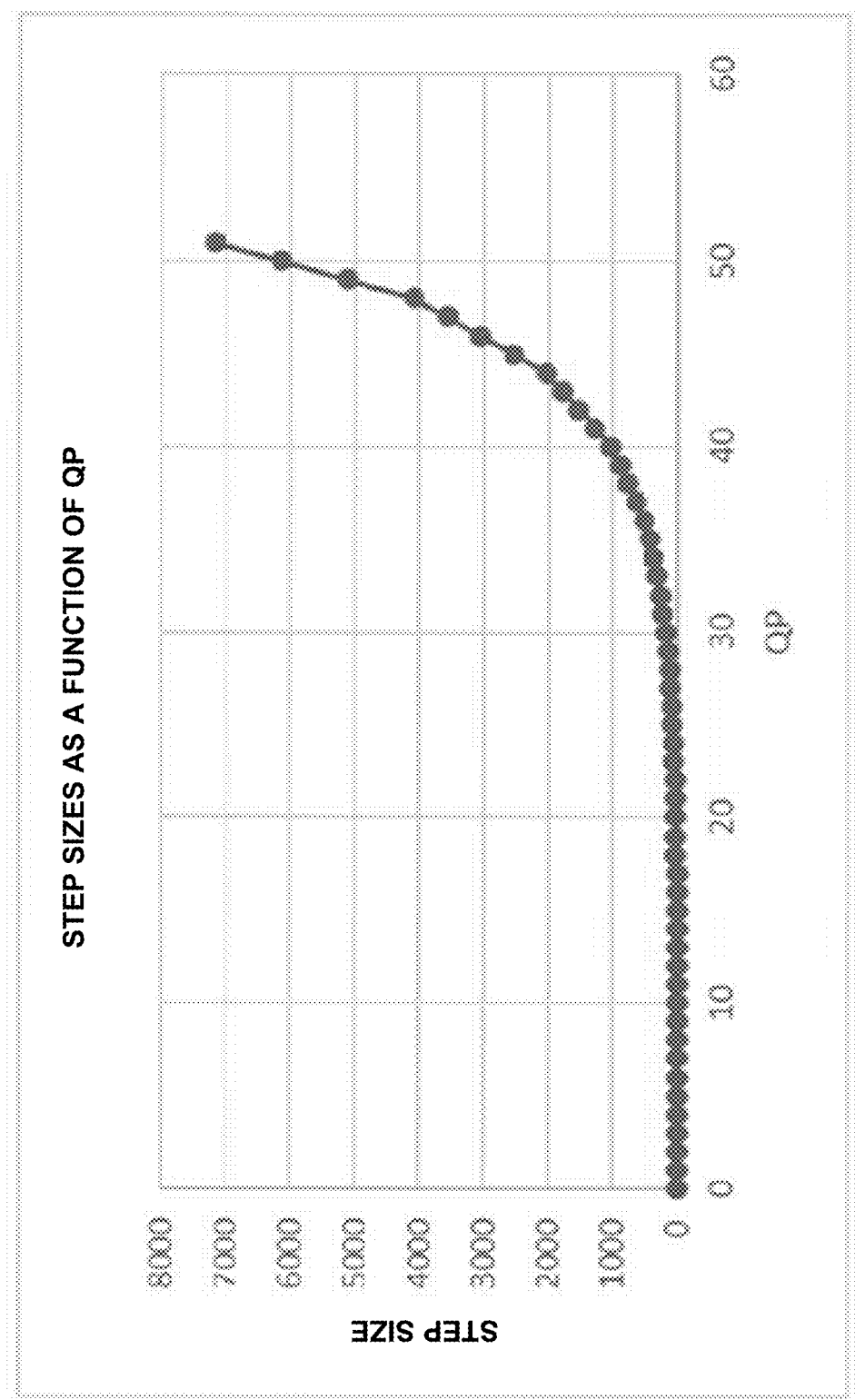
FIG. 4 is a diagram showing example step sizes of a function of a quantization parameter.

The resultant step sizes for most QPs are integers, but some non-integer step sizes are also specified. Table 1 specifies the step sizes for various QP values. FIG. 4 illustrates the same step size function as shown in Table 1.

TABLE 1

| QP | StepSize |
|---|---|
| 0 | 1 |
| 1 | 1.25 |
| 2 | 1.5 |
| 3 | 1.75 |
| 4 | 2 |
| 5 | 2.5 |
| 6 | 3 |

TABLE 1-continued

| QP | StepSize |
| --- | --- |
| 7 | 3.5 |
| 8 | 4 |
| 9 | 5 |
| 10 | 6 |
| 11 | 7 |
| 12 | 8 |
| 13 | 10 |
| 14 | 12 |
| 15 | 14 |
| 16 | 16 |
| 17 | 20 |
| 18 | 24 |
| 19 | 28 |
| 20 | 32 |
| 21 | 40 |
| 22 | 48 |
| 23 | 56 |
| 24 | 64 |
| 25 | 80 |
| 26 | 96 |
| 27 | 112 |
| 28 | 128 |
| 29 | 160 |
| 30 | 192 |
| 31 | 224 |
| 32 | 256 |
| 33 | 320 |
| 34 | 384 |
| 35 | 448 |
| 36 | 512 |
| 37 | 640 |
| 38 | 768 |
| 39 | 896 |
| 40 | 1024 |
| 41 | 1280 |
| 42 | 1536 |
| 43 | 1792 |
| 44 | 2048 |
| 45 | 2560 |
| 46 | 3072 |
| 47 | 3584 |
| 48 | 4096 |
| 49 | 5120 |
| 50 | 6144 |
| 51 | 7168 |

The scaling derivation specified in [G-PCC] CE13.29 report on geometry quantization QP control, m54610, Online, June-July 2020, specifies a hybrid scaling step derivation model, where for step sizes up to 8, there are four QP points for every doubling of the step size. Subsequently, after 8 step sizes, there are 6 QP points for every doubling of the step size. Since the value of 6 is not a power or two, this derivation needs additional steps (e.g., a division, instead of shifting) to compute the quantization step size.

Moreover, for some point cloud data, it may not be necessary to have a large number of QP values for every doubling of step size. In general, the more QP values for every doubling of step size, the more fine control G-PCC encoder 200 and G-PCC decoder 300 have over the quantization and scaling processes. However, for sparse content, it may be sufficient to have fewer QP values for every doubling of step sizes, or in some cases just 1 QP value (this translates to step sizes being a power of 2). Thus, there is a need for customizing the resolution of QP values based on the content.

Morever, certain tools in G-PCC do not perform well when in-tree quantization is applied. This generally applies to tools that use the inherent position of the point with respect to another reference point, such as angular mode or azimuthal mode. Sébastien Lasserre, Jonathan Taquet, "[GPCC][CE 13.22 related] An improvement of the planar coding mode," ISO/IEC JTC1/SC29/WG11 MPEG/m50642, Geneva, CH, October 2019, Sébastien Lasserre, Jonathan Taquet, "[GPCC] CE 13.22 report on angular mode," ISO/IEC JTC1/SC29/WG11 MPEG/m51594, Brussels, Belgium, January 2020, Sébastien Lasserre, Jonathan Taquet, "[GPCC] [CE13.22 related] The azimuthal coding mode," ISO/IEC JTC1/SC29/WG11 MPEG/m51596, Brussels, Belgium, January 2020, and Sébastien Lasserre, Jonathan Taquet, "[GPCC] [CE 13.22] Report on azimuthal coding mode," ISO/IEC JTC1/SC29/WG11 MPEG/m52958, Teleconference (previously Alpbach meeting), April 2020 describe some examples. In such cases, it may be beneficial to just restrict the quantization step sizes to a power of 2.

In view of these drawbacks, this disclosure describes methods and devices that improve the geometry quantization and scaling of geometry-based point clouds. In particular, this disclosure describes techniques for quantization parameter (QP) selection and signaling that allows for multiple levels of granularity for the quantization performed at G-PCC encoder 200 and the reciprocal scaling function performed at G-PCC decoder 300. In this way, the quantization and scaling processes performed by an encoder/decoder pair may be more adapted to the content being coded, thus improving coding efficiency. The adaptation of the QP and the reciprocal scaling factor to the content being coded may be particularly beneficial to point clouds, where certain regions of a point cloud may be substantially more dense (e.g., include more points) than other regions of the point cloud.

The techniques described in this disclosure may be implemented independently or combined with one or other techniques. The phrases step size, scale value, scale step size, scaling step size, all refer to the same value—a scale value that is used at G-PCC decoder 300.

In a first example of the disclosure, G-PCC encoder 200 and G-PCC decoder 300 may operate according to a specified maximum parameter value K that specifies the number of QP points per doubling of step size. In general, the maximum parameter value K specifies the number of granularity levels that may be used for the QP and the reciprocal scaling step size. In addition, the maximum parameter value K may be generally considered as the maximum precision of the QP values. For example when the value of K=3, four different levels of granularity are available (e.g., 0 to K), with a maximum precision of up to 8 QP points for each doubling of step size. Note that the granularity of the QP value here refers to the QP value that is used to derive the quantization/scaling step size. The signaled value may not be the same as this QP value; e.g., if the granularity/precision of QP values is 2 (i.e., the values of QP values are to take values 0, 2, 4, 6, 8, . . . ), the signalled values may be 0, 1, 2, 3, 4, . . . such that the derived QP values are obtained by multiplying the signaled values by the precision value of 2.

G-PCC encoder 200 may be configured to determine a parameter value k that is used to derive the actual precision of the scaling step sizes. The value of k may be an integer value that is restricted to be in the range of 0 to K, inclusive. For example, when the parameter value k=0, then the QP values are allowed to take the full precision of QP values (e.g., 8 QP points for each doubling of the step size used at G-PCC decoder 300). As will be shown below, different values of parameter value k may indicate different QP precisions in terms of the number of QP points per the doubling of the scaling step size. In some examples, G-PCC encoder 200 may determine the parameter value k based on the point cloud content. For example, G-PCC encoder 200 may determine a parameter value k that has a higher precision (e.g., more QP points per doubling of the scaling step size) for more dense point cloud content. In other examples, G-PCC encoder 2000 may determine a parameter value k that has a lower precision (e.g., fewer QP points per doubling of the scaling step size) for more sparse point cloud content.

In one example, the parameter value k may be restricted to be the same for all of the slices/data units in the picture. In other examples, G-PCC encoder 200 may signal a syntax element for the parameter value k at one or more levels of the point cloud. For example, G-PCC encoder 200 may encode and signal a syntax element that indicates the parameter value k in any parameter set (e.g., a sequence parameter set (SPS), a GPS, an adaptation parameter set (APS), etc.). In other examples, G-PCC encoder 200 may encode and signal a syntax element that indicates the parameter value k in a data unit and/or slice.

In another example, a maximum value of the QP allowed to be signalled may be specified to be a function of parameter value k and maximum parameter value K. For example, the maximum value of the QP may be restricted to be [minNodeSize<<(K−k)]−1, where minNodeSize is the minimum dimension (of the three dimensions) of the size of the node. The value of the QP may be clipped to a maximum QP value.

In one example, the normalized step sizes for various values of k, for K=3 may be as follows:

| QP | k = 0 | k = 1 | k = 2 | k = 3 |
|---|---|---|---|---|
| 0 | 1 | 1 | 1 | 1 |
| 1 | 1.125 | 1.25 | 1.5 | 2 |
| 2 | 1.25 | 1.5 | 2 | 4 |
| 3 | 1.375 | 1.75 | 3 | 8 |
| 4 | 1.5 | 2 | 4 | 16 |
| 5 | 1.625 | 2.5 | 6 | 32 |
| 6 | 1.75 | 3 | 8 | 64 |
| 7 | 1.875 | 3.5 | 12 | 128 |
| 8 | 2 | 4 | 16 | 256 |
| 9 | 2.25 | 5 | 24 | 512 |
| 10 | 2.5 | 6 | 32 | ... |
| 11 | 2.75 | 7 | 48 | |
| 12 | 3 | 8 | 64 | |
| 13 | 3.25 | 10 | 96 | |
| 14 | 3.5 | 12 | 128 | |
| 15 | 3.75 | 14 | ... | |
| 16 | 4 | 16 | | |
| 17 | 4.5 | 20 | | |
| 18 | 5 | 24 | | |
| 19 | 5.5 | 28 | | |
| 20 | 6 | 32 | | |
| 21 | 6.5 | 40 | | |
| 22 | 7 | 48 | | |
| 23 | 7.5 | 56 | | |
| 24 | 8 | 64 | | |
| 25 | 9 | 80 | | |

In the above example, when the parameter value k=0 and the maximum parameter value K=3, the scaling step size doubles for every 8 QP points. When the parameter value k=1 and the maximum parameter value K=3, the scaling step size doubles for every 4 QP points. When the parameter value k=2 and the maximum parameter value K=3, the scaling step size doubles for every 2 QP points. When the parameter value k=3 and the maximum parameter value K=3, the scaling step size doubles for every 1 QP point.

In another example, the normalized step sizes for various values of k, for K=3 may be as follows:

| QP | k = 0 | k = 1 | k = 2 | k = 3 |
|---|---|---|---|---|
| 0 | 1 | 1 | 1 | 1 |
| 1 | 1.125 | 1.25 | 1.5 | 2 |
| 2 | 1.25 | 1.5 | 2 | 4 |
| 3 | 1.375 | 1.75 | 3 | 8 |
| 4 | 1.5 | 2 | 4 | 16 |
| 5 | 1.75 | 2.5 | 6 | 32 |
| 6 | 2 | 3 | 8 | 64 |
| 7 | 2.25 | 3.5 | 12 | 128 |
| 8 | 2.5 | 4 | 16 | 256 |
| 9 | 2.75 | 5 | 24 | 512 |
| 10 | 3 | 6 | 32 | ... |
| 11 | 3.5 | 7 | 48 | |
| 12 | 4 | 8 | 64 | |
| 13 | 4.5 | 10 | 96 | |
| 14 | 5 | 12 | 128 | |
| 15 | 5.5 | 14 | ... | |
| 16 | 6 | 16 | | |
| 17 | 7 | 20 | | |
| 18 | 8 | 24 | | |
| 19 | 9 | 28 | | |
| 20 | 10 | 32 | | |
| 21 | 11 | 40 | | |
| 22 | 12 | 48 | | |
| 23 | 14 | 56 | | |
| 24 | 16 | 64 | | |
| 25 | 18 | 80 | | |

In view of the above, in one example of the disclosure, G-PCC encoder 200 may be configured to determine a quantization parameter (QP) value based on a parameter value k, wherein the parameter value k specifies a number of QP points per doubling of a scaling step size to be used at a decoder. G-PCC encoder 200 may encode a point cloud using the QP value. For example, G-PCC encoder 200 may quantize a node position of the point cloud using the determined QP.

G-PCC encoder 200 may be further configured to encode one or more syntax elements that indicate the QP value. For example, G-PCC encoder 200 may encode the syntax elements in the geometry parameter set (e.g., geom_base_qp), geometry slice header (geom_slice_qp_offset), and geometry node (e.g., geom_node_qp_offset_sign_flag and geom_node_qp_offset_abs_minus1) described above. In addition, G-PCC encoder 200 may encode a syntax element that indicates the parameter value k. For example, G-PCC encoder 200 may encode the syntax element that indicates the parameter value k in one or more of a sequence parameter set, a geometry parameter set, an adaptation parameter set, a slice, or a data unit. In this example, the one or more syntax elements that indicate the QP value comprise a value right shifted by the parameter value k. For example, the encoded syntax element may be derived as the QP value (e.g., used for step size derivation)>>k. At G-PCC decoder 300, the QP value is derived by multiplying a value (q) of the one or more syntax elements with a function of the parameter value k (e.g., q<<k or q*2k).

In one example, the parameter value k is an integer that ranges from 0 to a maximum parameter value K, wherein the maximum parameter value K indicates a maximum precision of the QP value. In a specific example, the maximum parameter value K equal to 3 indicates the maximum precision of 8 QP points per doubling of the scaling step size. In this specific example, the parameter value k equal to a first value indicates 8 QP points per doubling of the scaling step size, the parameter value k equal to a second value indicates 4 QP points per doubling of the scaling step size, the parameter value k equal to a third value indicates 2 QP points per doubling of the scaling step size, and the parameter value k equal to a fourth value indicates 1 QP point per doubling of the scaling step size.

In a reciprocal fashion, G-PCC decoder 300 may be configured to decode one or more syntax elements that indicate a QP value. For example, G-PCC decoder 300 may decode the syntax elements in the geometry parameter set (e.g., geom_base_qp), geometry slice header (geom_slice_qp_offset), and geometry node (e.g., geom_node_qp_offset_sign_flag and geom_node_qp_offset_abs_minus1) described above, and may determine the QP values from the decoded syntax elements. G-PCC decoder 300 may further decode a syntax element that indicates a parameter value k, wherein the parameter value k specifies a number of QP points per doubling of a scaling step size.

G-PCC decoder 300 may determine the scaling step size based on the QP value and the parameter value k. An example of how G-PCC decoder 300 may be configured to determine the scaling step size is described below. G-PCC decoder 300 may then decode the point cloud using the determined scaling step size. For example, G-PCC decoder 300 may scale a node position of the point cloud using the determined scaling step size.

Example Implementation

In this example, G-PCC encoder 200 and G-PCC decoder 300 may be configured to operate according to a parameter that specifies the level of granularity of the QP value. In one example, the maximum granularity maybe specified to be the maximum parameter value K=3. This means that for every doubling of step size, at most 8 QP points may be specified. For example, if k is signaled as 1, then the number of QP points for doubling of the step size is specified to be $2^{K-k}=4$ (which is the anchor). However, in other examples, G-PCC encoder 200 may determine more points per doubling of step size, and may signal the value of k to be 0. The value of k=3 means that only step sizes that are powers of 2 are allowed to be signaled. The maximum value of QP is also modified accordingly.

Potential benefits of this technique include improving the efficiency for signaling the QP value and QP offset in cases where the higher precision of QP is not necessary. This may happen for sparse content, or when the content is sparse at certain quantization node sizes, where additional precision of QP values are not necessary. In other cases, when certain modes are enabled (e.g., angular mode), it may be possible to easily restrict the quantization to be certain values (e.g., powers of 2). For example, for spatial scalability, only step size with a power of 2 may be used in some examples. Other step sizes may not provide sufficient benefit when such tools are enabled, and this configurable parameter value k provides an easy way to prevent the selection of such step sizes.

Due to these reasons, the parameter value k (also called a QP refinement factor), may be signaled in the GPS along with other syntax elements related to geometry-specific tools.

The step size qS (or scaling step size) for the quantization is derived as follows for QP value qp:

$$sh=(qp<<k)>>3$$

$$qS=(8+(qp<<k)\%8)<<sh$$

The scaling process is as follows: $(x*qS+4)>>3$.

In a more generic form as a function of K, the step size is derived as follows:

$$M=1<<K$$

$$sh=(qp<<k)>>K$$

$$qS=(M+(qp<<k)\%M)<<sh$$

The scaling process is as follows: $(x*qS+(M/2))>>M$.

Figure 5:
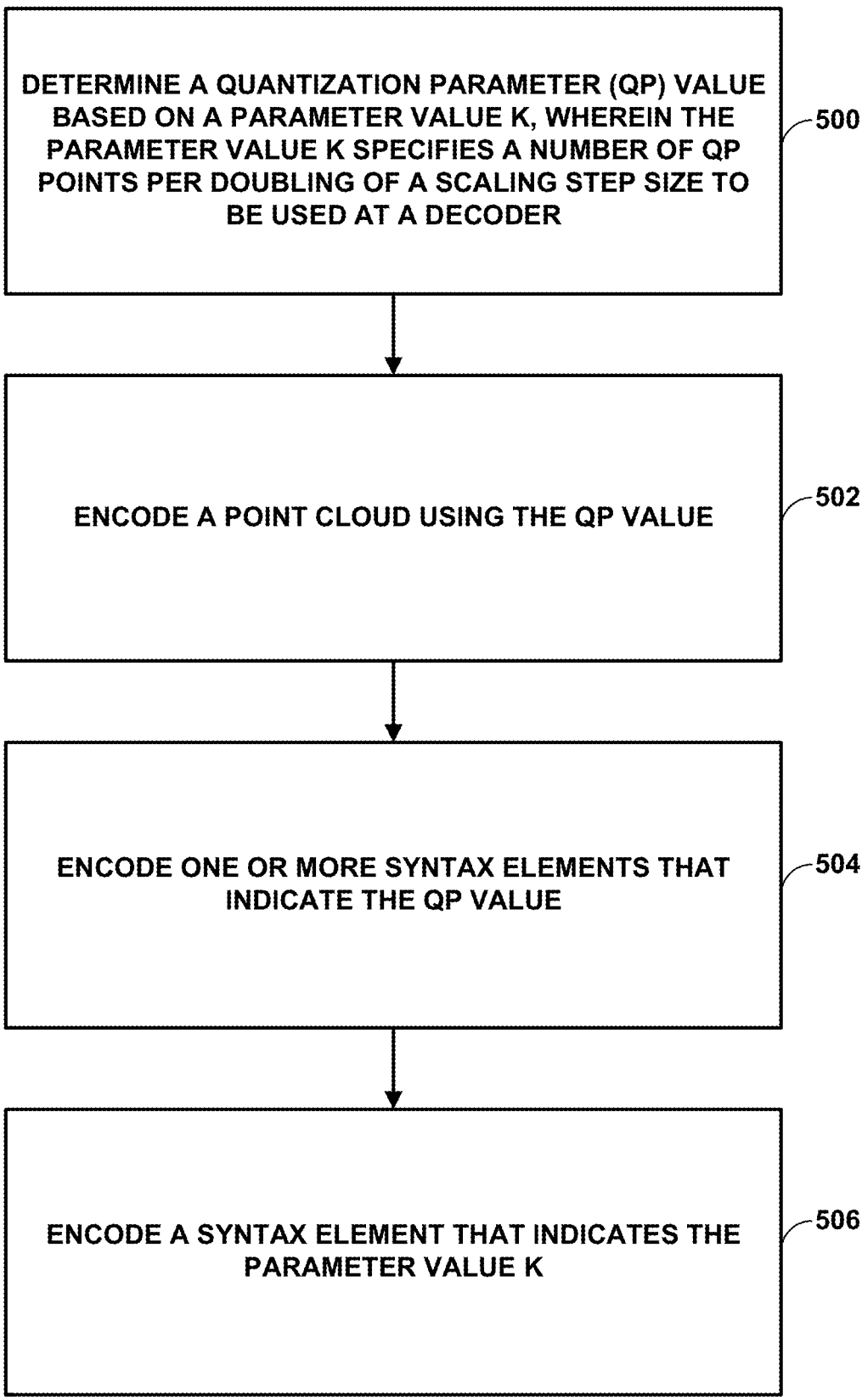
FIG. 5 is a flowchart illustrating an example encoding method of the disclosure.

FIG. 5 is a flowchart illustrating an example encoding method of the disclosure. One or more structural components of G-PCC encoder 200 may be configured to perform the techniques of FIG. 5.

In one example, G-PCC encoder 200 may be configured to determine a quantization parameter (QP) value based on a parameter value k, wherein the parameter value k specifies a number of QP points per doubling of a scaling step size to be used at a decoder (500). G-PCC encoder 200 may encode a point cloud using the QP value (502). For example, G-PCC encoder 200 may quantize a node position of the point cloud using the determined QP.

G-PCC encoder 200 may be further configured to encode one or more syntax elements that indicate the QP value (504). For example, G-PCC encoder 200 may encode the syntax elements in the geometry parameter set (e.g., geom_base_qp), geometry slice header (geom_slice_qp_offset), and geometry node (e.g., geom_node_qp_offset_sign_flag and geom_node_qp_offset_abs_minus1) described above. In addition, G-PCC encoder 200 may encode a syntax element that indicates the parameter value k (506). For example, G-PCC encoder 200 may encode the syntax element that indicates the parameter value k in one or more of a sequence parameter set, a geometry parameter set, an adaptation parameter set, a slice, or a data unit.

In one example, the parameter value k is an integer that ranges from 0 to a maximum parameter value K, wherein the maximum parameter value K indicates a maximum precision of the QP value. In a specific example, the maximum parameter value K equal to 3 indicates the maximum precision of 8 QP points per doubling of the scaling step size. In this specific example, the parameter value k equal to a first value indicates 8 QP points per doubling of the scaling step size, the parameter value k equal to a second value indicates 4 QP points per doubling of the scaling step size, the parameter value k equal to a third value indicates 2 QP points per doubling of the scaling step size, and the parameter value k equal to a fourth value indicates 1 QP point per doubling of the scaling step size.

Figure 6:
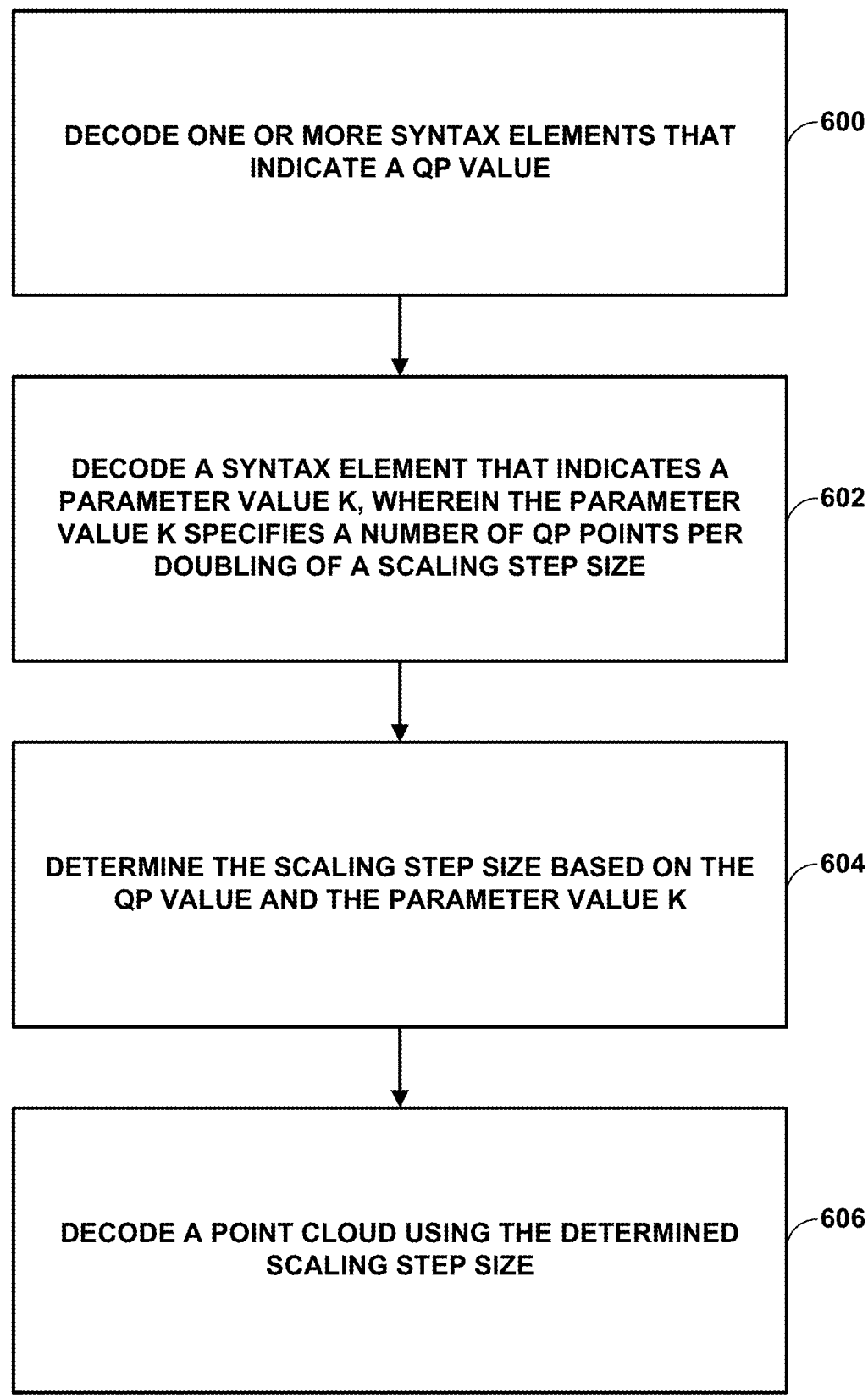
FIG. 6 is a flowchart illustrating an example decoding method of the disclosure.

FIG. 6 is a flowchart illustrating an example decoding method of the disclosure. One or more structural components of G-PCC decoder 300 may be configured to perform the techniques of FIG. 6.

G-PCC decoder 300 may be configured to decode one or more syntax elements that indicate a QP value (600). For example, G-PCC decoder 300 may decode the syntax elements in the geometry parameter set (e.g., geom_base_qp), geometry slice header (geom_slice_qp_offset), and geometry node (e.g., geom_node_qp_offset_sign_flag and geom_node_qp_offset_abs_minus1) described above, and may determine the QP values from the decoded syntax elements. G-PCC decoder 300 may further decode a syntax element that indicates a parameter value k, wherein the parameter value k specifies a number of QP points per doubling of a scaling step size (602).

In one example, the parameter value k is an integer that ranges from 0 to a maximum parameter value K, wherein the maximum parameter value K indicates a maximum precision of the QP value. In a specific example, the maximum parameter value K equal to 3 indicates the maximum precision of 8 QP points per doubling of the scaling step size. In this specific example, the parameter value k equal to a first value indicates 8 QP points per doubling of the scaling step size, the parameter value k equal to a second value indicates 4 QP points per doubling of the scaling step size, the parameter value k equal to a third value indicates 2 QP points per doubling of the scaling step size, and the parameter value k equal to a fourth value indicates 1 QP point per doubling of the scaling step size.

G-PCC decoder 300 may determine the scaling step size based on the QP value and the parameter value k (604). For example, G-PCC decoder 300 may be configured to determine the scaling step size using the techniques in the example implementation described above. G-PCC decoder 300 may then decode the point cloud using the determined scaling step size (606). For example, G-PCC decoder 300 may scale a node position of the point cloud using the determined scaling step size.

Example uses for G-PCC encoding and decoding using the quantization and scaling techniques of this disclosure are described below. However, it should be understood that the techniques of this disclosure are applicable for use with any point cloud compression techniques that use quantization and/or scaling.

Figure 7:
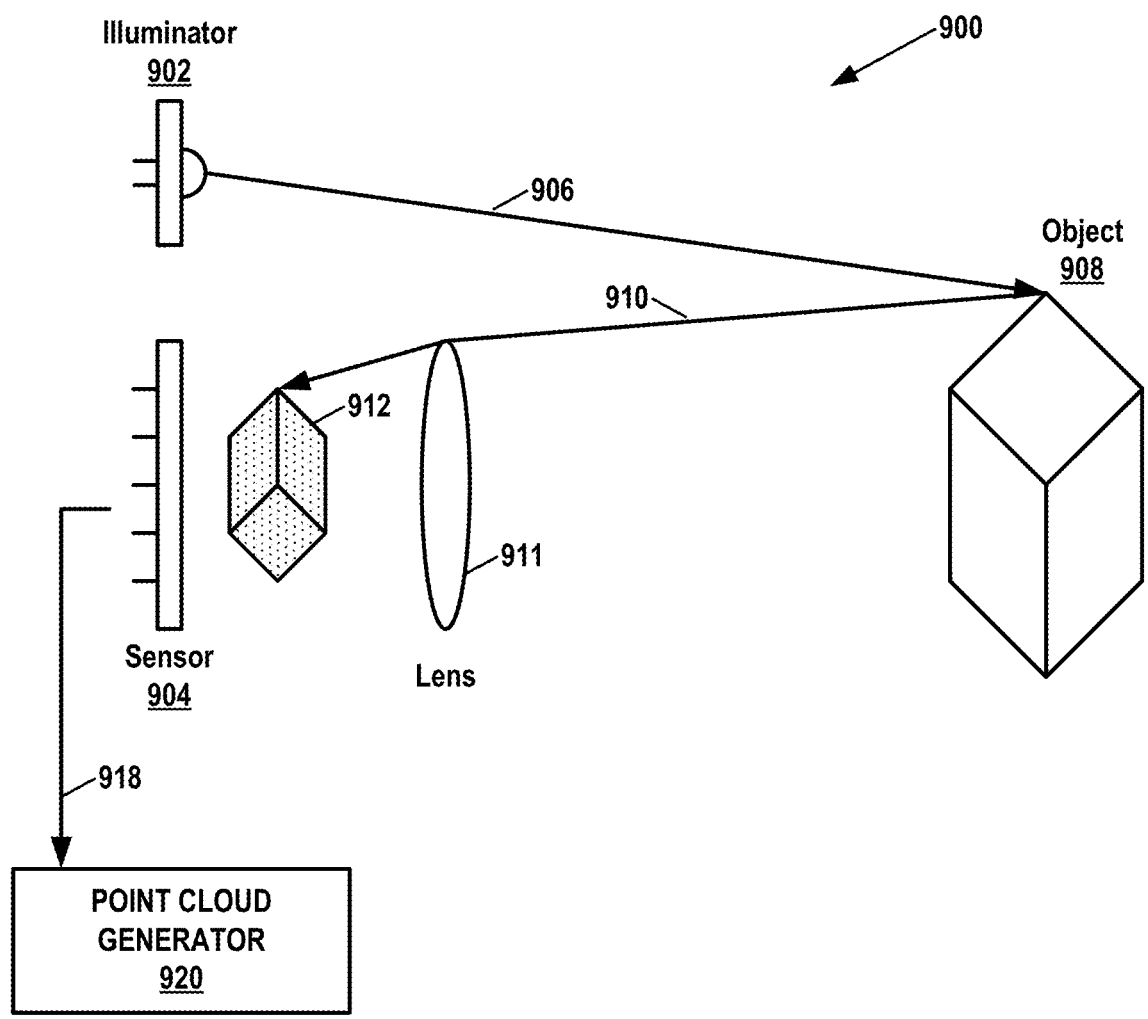
FIG. 7 is a conceptual diagram illustrating an example range-finding system that may be used with one or more techniques of this disclosure.

FIG. 7 is a conceptual diagram illustrating an example range-finding system 900 that may be used with one or more techniques of this disclosure. In the example of FIG. 7, range-finding system 900 includes an illuminator 902 and a sensor 904. Illuminator 902 may emit light 906. In some examples, illuminator 902 may emit light 906 as one or more laser beams. Light 906 may be in one or more wavelengths, such as an infrared wavelength or a visible light wavelength. In other examples, light 906 is not coherent, laser light. When light 906 encounters an object, such as object 908, light 906 creates returning light 910. Returning light 910 may include backscattered and/or reflected light. Returning light 910 may pass through a lens 911 that directs returning light 910 to create an image 912 of object 908 on sensor 904. Sensor 904 generates signals 914 based on image 912. Image 912 may comprise a set of points (e.g., as represented by dots in image 912 of FIG. 7).

In some examples, illuminator 902 and sensor 904 may be mounted on a spinning structure so that illuminator 902 and sensor 904 capture a 360-degree view of an environment. In other examples, range-finding system 900 may include one or more optical components (e.g., mirrors, collimators, diffraction gratings, etc.) that enable illuminator 902 and sensor 904 to detect objects within a specific range (e.g., up to 360-degrees). Although the example of FIG. 7 only shows a single illuminator 902 and sensor 904, range-finding system 900 may include multiple sets of illuminators and sensors.

In some examples, illuminator 902 generates a structured light pattern. In such examples, range-finding system 900 may include multiple sensors 904 upon which respective images of the structured light pattern are formed. Range-finding system 900 may use disparities between the images of the structured light pattern to determine a distance to an object 908 from which the structured light pattern backscatters. Structured light-based range-finding systems may have a high level of accuracy (e.g., accuracy in the sub-millimeter range), when object 908 is relatively close to sensor 904 (e.g., 0.2 meters to 2 meters). This high level of accuracy may be useful in facial recognition applications, such as unlocking mobile devices (e.g., mobile phones, tablet computers, etc.) and for security applications.

In some examples, range-finding system 900 is a time of flight (ToF)-based system. In some examples where range-finding system 900 is a ToF-based system, illuminator 902 generates pulses of light. In other words, illuminator 902 may modulate the amplitude of emitted light 906. In such examples, sensor 904 detects returning light 910 from the pulses of light 906 generated by illuminator 902. Range-finding system 900 may then determine a distance to object 908 from which light 906 backscatters based on a delay between when light 906 was emitted and detected and the known speed of light in air). In some examples, rather than (or in addition to) modulating the amplitude of the emitted light 906, illuminator 902 may modulate the phase of the emitted light 1404. In such examples, sensor 904 may detect the phase of returning light 910 from object 908 and determine distances to points on object 908 using the speed of light and based on time differences between when illuminator 902 generated light 906 at a specific phase and when sensor 904 detected returning light 910 at the specific phase.

In other examples, a point cloud may be generated without using illuminator 902. For instance, in some examples, sensor 904 of range-finding system 900 may include two or more optical cameras. In such examples, range-finding system 900 may use the optical cameras to capture stereo images of the environment, including object 908. Range-finding system 900 (e.g., point cloud generator 920) may then calculate the disparities between locations in the stereo images. Range-finding system 900 may then use the disparities to determine distances to the locations shown in the stereo images. From these distances, point cloud generator 920 may generate a point cloud.

Sensors 904 may also detect other attributes of object 908, such as color and reflectance information. In the example of FIG. 7, a point cloud generator 920 may generate a point cloud based on signals 918 generated by sensor 904. Range-finding system 900 and/or point cloud generator 920 may form part of data source 104 (FIG. 1).

Figure 8:
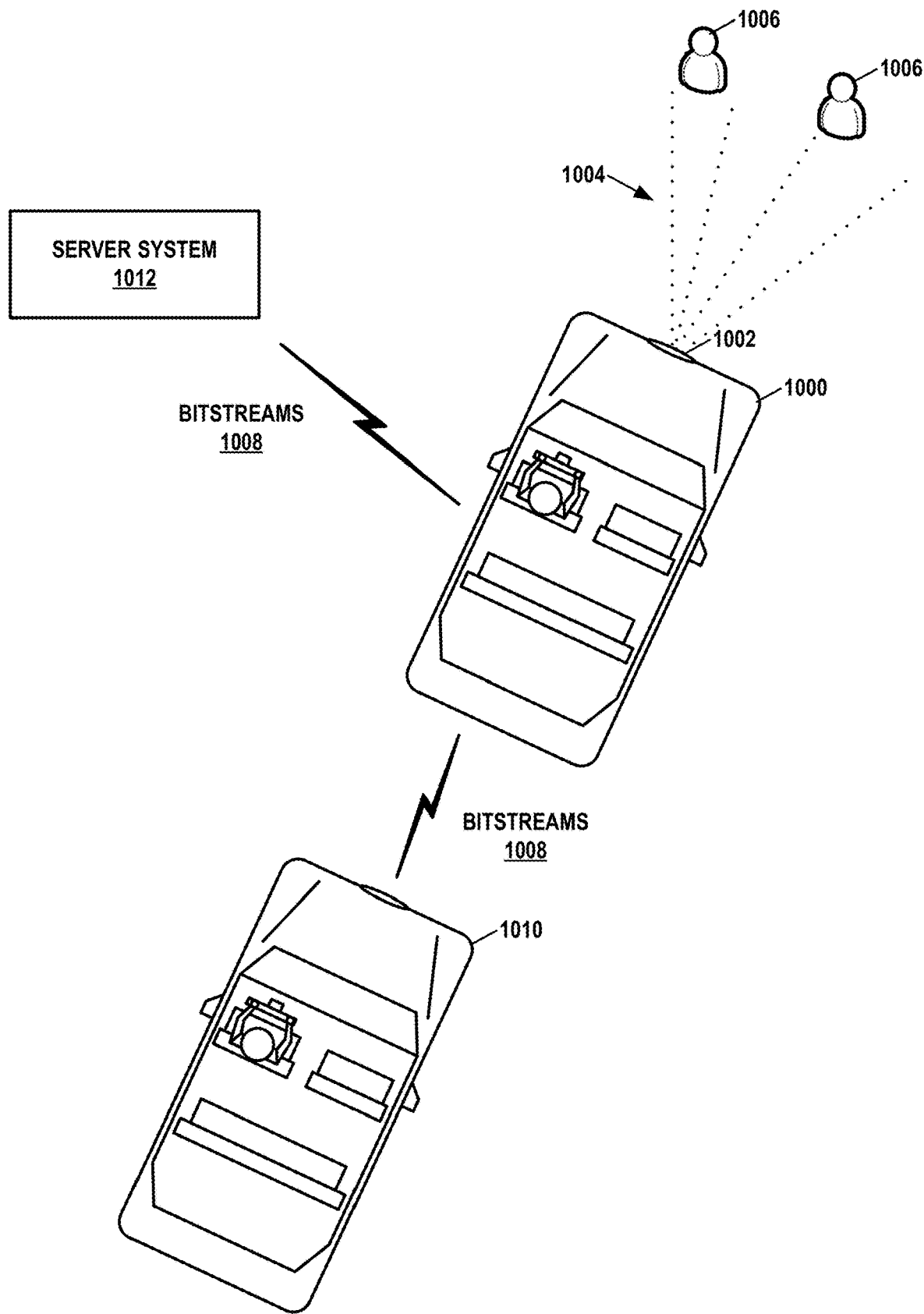
FIG. 8 is a conceptual diagram illustrating an example vehicle-based scenario in which one or more techniques of this disclosure may be used.

FIG. 8 is a conceptual diagram illustrating an example vehicle-based scenario in which one or more techniques of this disclosure may be used. In the example of FIG. 8, a vehicle 1000 includes a laser package 1002, such as a LIDAR system. Although not shown in the example of FIG. 8, vehicle 1000 may also include a data source, such as data source 104 (FIG. 1), and a G-PCC encoder, such as G-PCC encoder 200 (FIG. 1). In the example of FIG. 8, laser package 1002 emits laser beams 1004 that reflect off pedestrians 1006 or other objects in a roadway. The data source of vehicle 1000 may generate a point cloud based on signals generated by laser package 1002. The G-PCC encoder of vehicle 1000 may encode the point cloud to generate bitstreams 1008, such as geometry bitstream 203 (FIG. 2) and attribute bitstream 205 (FIG. 2). Bitstreams 1008 may include many fewer bits than the unencoded point cloud obtained by the G-PCC encoder. An output interface of vehicle 1000 (e.g., output interface 108 (FIG. 1) may transmit bitstreams 1008 to one or more other devices. Thus, vehicle 1000 may be able to transmit bitstreams 1008 to other devices more quickly than the unencoded point cloud data. Additionally, bitstreams 1008 may require less data storage capacity.

In the example of FIG. 8, vehicle 1000 may transmit bitstreams 1008 to another vehicle 1010. Vehicle 1010 may include a G-PCC decoder, such as G-PCC decoder 300 (FIG. 1). The G-PCC decoder of vehicle 1010 may decode bitstreams 1008 to reconstruct the point cloud. Vehicle 1010 may use the reconstructed point cloud for various purposes. For instance, vehicle 1010 may determine based on the reconstructed point cloud that pedestrians 1006 are in the roadway ahead of vehicle 1000 and therefore start slowing down, e.g., even before a driver of vehicle 1010 realizes that pedestrians 1006 are in the roadway. Thus, in some examples, vehicle 1010 may perform an autonomous navigation operation, generate a notification or warning, or perform another action based on the reconstructed point cloud.

Additionally or alternatively, vehicle 1000 may transmit bitstreams 1008 to a server system 1012. Server system 1012 may use bitstreams 1008 for various purposes. For example, server system 1012 may store bitstreams 1008 for subsequent reconstruction of the point clouds. In this example, server system 1012 may use the point clouds along with other data (e.g., vehicle telemetry data generated by vehicle 1000) to train an autonomous driving system. In other example, server system 1012 may store bitstreams 1008 for subsequent reconstruction for forensic crash investigations (e.g., if vehicle 1000 collides with pedestrians 1006).

Figure 9:
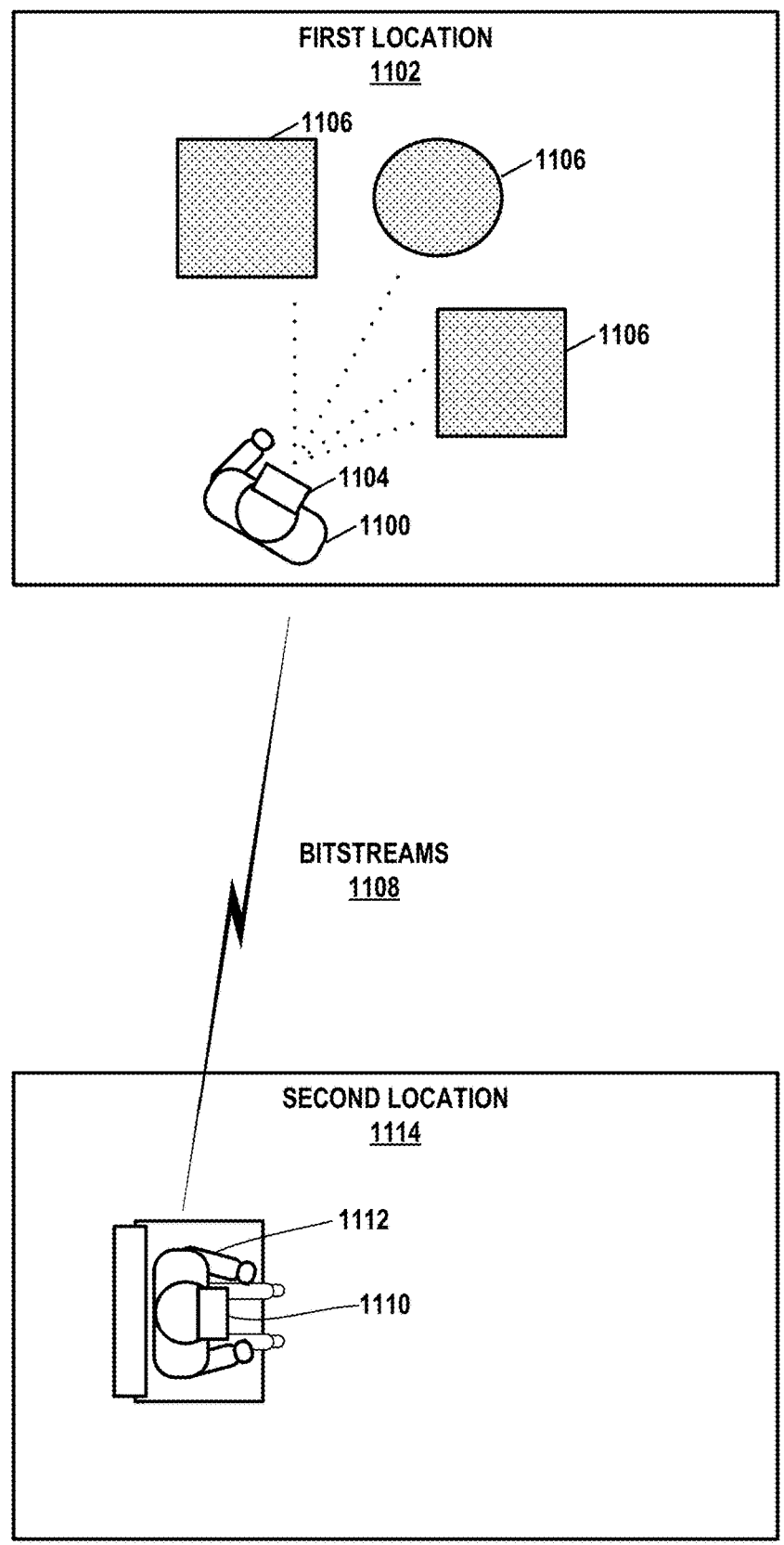
FIG. 9 is a conceptual diagram illustrating an example extended reality system in which one or more techniques of this disclosure may be used.

FIG. 9 is a conceptual diagram illustrating an example extended reality system in which one or more techniques of this disclosure may be used. Extended reality (XR) is a term used to cover a range of technologies that includes augmented reality (AR), mixed reality (MR), and virtual reality (VR). In the example of FIG. 9, a first user 1100 is located in a first location 1102. User 1100 wears an XR headset 1104. As an alternative to XR headset 1104, user 1100 may use a mobile device (e.g., mobile phone, tablet computer, etc.). XR headset 1104 includes a depth detection sensor, such as a LIDAR system, that detects positions of points on objects 1106 at location 1102. A data source of XR headset 1104 may use the signals generated by the depth detection sensor to generate a point cloud representation of objects 1106 at location 1102. XR headset 1104 may include a G-PCC encoder (e.g., G-PCC encoder 200 of FIG. 1) that is configured to encode the point cloud to generate bitstreams 1108.

XR headset 1104 may transmit bitstreams 1108 (e.g., via a network such as the Internet) to an XR headset 1110 worn by a user 1112 at a second location 1114. XR headset 1110 may decode bitstreams 1108 to reconstruct the point cloud. XR headset 1110 may use the point cloud to generate an XR visualization (e.g., an AR, MR, VR visualization) representing objects 1106 at location 1102. Thus, in some examples, such as when XR headset 1110 generates a VR visualization, user 1112 at location 1114 may have a 3D immersive experience of location 1102. In some examples, XR headset 1110 may determine a position of a virtual object based on the reconstructed point cloud. For instance, XR headset 1110 may determine, based on the reconstructed point cloud, that an environment (e.g., location 1102) includes a flat surface and then determine that a virtual object (e.g., a cartoon character) is to be positioned on the flat surface. XR headset 1110 may generate an XR visualization in which the virtual object is at the determined position. For instance, XR headset 1110 may show the cartoon character sitting on the flat surface.

Figure 10:
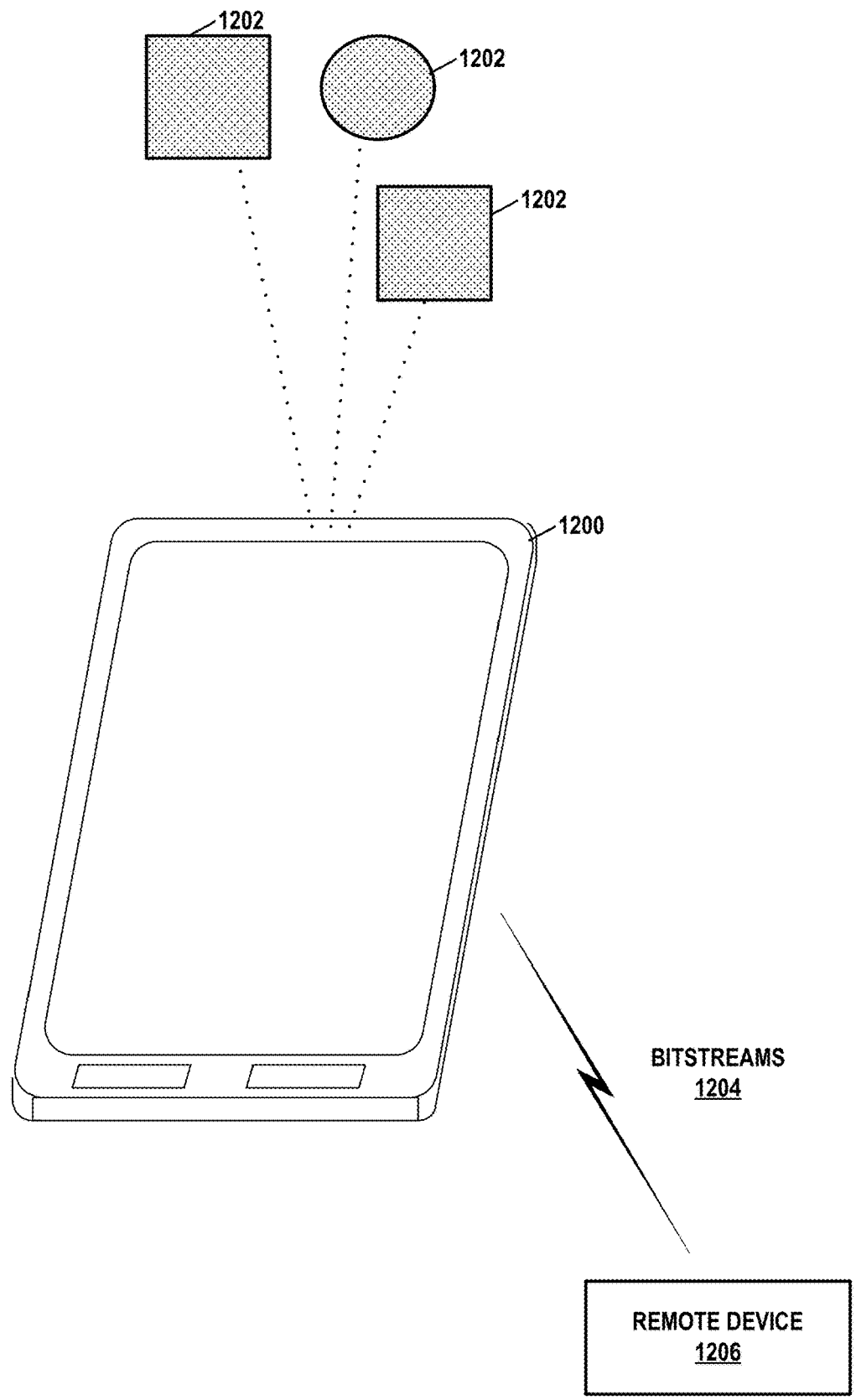
FIG. 10 is a conceptual diagram illustrating an example mobile device system in which one or more techniques of this disclosure may be used.

FIG. 10 is a conceptual diagram illustrating an example mobile device system in which one or more techniques of this disclosure may be used. In the example of FIG. 10, a mobile device 1200, such as a mobile phone or tablet computer, includes a depth detection sensor, such as a LIDAR system, that detects positions of points on objects 1202 in an environment of mobile device 1200. A data source of mobile device 1200 may use the signals generated by the depth detection sensor to generate a point cloud representation of objects 1202. Mobile device 1200 may include a G-PCC encoder (e.g., G-PCC encoder 200 of FIG. 1) that is configured to encode the point cloud to generate bitstreams 1204. In the example of FIG. 10, mobile device 1200 may transmit bitstreams to a remote device 1206, such as a server system or other mobile device. Remote device 1206 may decode bitstreams 1204 to reconstruct the point cloud. Remote device 1206 may use the point cloud for various purposes. For example, remote device 1206 may use the point cloud to generate a map of an environment of mobile device 1200. For instance, remote device 1206 may generate a map of an interior of a building based on the reconstructed point cloud. In another example, remote device 1206 may generate imagery (e.g., computer graphics) based on the point cloud. For instance, remote device 1206 may use points of the point cloud as vertices of polygons and use color attributes of the points as the basis for shading the polygons. In some examples, remote device 1206 may perform facial recognition using the point cloud.

The following is a non-limiting list of aspects that may be in accordance with one or more techniques of this disclosure.

Aspect 1A—A method of coding a point cloud, the method comprising: determining a quantization parameter (QP) value based on a maximum value K that specifies the number of QP points per doubling of scaling step size; and coding the point cloud using the QP value.

Aspect 2A—The method of Aspect 1A, wherein the value of K equals 3, such that there are 8 QP points per each doubling of step size.

Aspect 3A—A method of coding a point cloud, the method comprising: determining a quantization parameter (QP) value based on a scaling step size, wherein a value of k specifies a precision of the scaling step size; and coding the point cloud using the QP value.

Aspect 4A—The method of Aspect 3A, wherein k is between zero and a maximum value K that specifies the number of QP points per doubling of the scaling step size.

Aspect 5A—The method of Aspect 3A, further comprising: restricting the value of k for all slices or data units of a picture of point cloud data.

Aspect 6A—The method of Aspect 3A, further comprising: coding the value of k in one or more of a sequence parameter set, geometry parameter set, adaptation parameter set, data unit, or slice.

Aspect 7A—The method of Aspect 4A, wherein determining the QP value further comprises: determining the QP value based on a maximum QP value, wherein the maximum QP value is a function of k and K.

Aspect 8A—The method of any combination of Aspects 1A-7A.

Aspect 9A—The method of any of Aspects 1A-8A, further comprising generating the point cloud.

Aspect 10A—A device for processing a point cloud, the device comprising one or more means for performing the method of any of Aspects 1A-9A.

Aspect 11A—The device of Aspect 10A, wherein the one or more means comprise one or more processors implemented in circuitry.

Aspect 12A—The device of any of Aspects 10A or 11A, further comprising a memory to store the data representing the point cloud.

Aspect 13A—The device of any of Aspects 10A-12A, wherein the device comprises a decoder.

Aspect 14A—The device of any of Aspects 10A-13A, wherein the device comprises an encoder.

Aspect 15A—The device of any of Aspects 10A-14A, further comprising a device to generate the point cloud.

Aspect 16A—The device of any of Aspects 10A-15A, further comprising a display to present imagery based on the point cloud.

Aspect 17A—A computer-readable storage medium having stored thereon instructions that, when executed, cause one or more processors to perform the method of any of Aspects 1A-9A.

Aspect 1B—An apparatus configured to encode a point cloud, the apparatus comprising: a memory configured to store the point cloud; and one or more processors implemented in circuitry and in communication with the memory, the one or more processors configured to: determine a quantization parameter (QP) value based on a parameter value k, wherein the parameter value k specifies a number of QP points per doubling of a scaling step size to be used at a decoder; encode the point cloud using the QP value; encode one or more syntax elements that indicate the QP value; and encode a syntax element that indicates the parameter value k.

Aspect 2B—The apparatus of Aspect 1B, wherein the one or more syntax elements that indicate the QP value comprise a value right shifted by the parameter value k.

Aspect 3B—The apparatus of Aspect 1B, wherein the parameter value k is an integer that ranges from 0 to a maximum parameter value K, wherein the maximum parameter value K indicates a maximum precision of the QP value.

Aspect 4B—The apparatus of Aspect 3B, wherein the maximum parameter value K equal to 3 indicates the maximum precision of 8 QP points per doubling of the scaling step size.

Aspect 5B—The apparatus of Aspect 4B, wherein the parameter value k equal to a first value indicates 8 QP points per doubling of the scaling step size, the parameter value k equal to a second value indicates 4 QP points per doubling of the scaling step size, the parameter value k equal to a third value indicates 2 QP points per doubling of the scaling step size, and the parameter value k equal to a fourth value indicates 1 QP point per doubling of the scaling step size.

Aspect 6B—The apparatus of Aspect 4B, wherein the QP value is derived by multiplying a value of the one or more syntax elements with a function of the parameter value k.

Aspect 7B—The apparatus of any of Aspects 1B-6B, wherein to encode the syntax element that indicates the parameter value k, the one or more processors are further configured to: encode the syntax element that indicates the parameter value k in one or more of a sequence parameter set, a geometry parameter set, an adaptation parameter set, a slice, or a data unit.

Aspect 8B—The apparatus of any of Aspects 1B-7B, wherein to encode the point cloud using the QP value, the one or more processors are further configured to: quantize a node position of the point cloud using the determined QP.

Aspect 9B—The apparatus of any of Aspects 1B-8B, further comprising: a sensor configured to generate the point cloud.

Aspect 10B—A method of encoding a point cloud, the method comprising: determining a quantization parameter (QP) value based on a parameter value k, wherein the parameter value k specifies a number of QP points per doubling of a scaling step size to be used at a decoder; encoding the point cloud using the QP value; encoding one or more syntax elements that indicate the QP value; and encoding a syntax element that indicates the parameter value k.

Aspect 11B—The method of Aspect 10B, wherein the one or more syntax elements that indicate the QP value comprise a value right shifted by the parameter value k.

Aspect 12B—The method of Aspect 10B, wherein the parameter value k is an integer that ranges from 0 to a maximum parameter value K, wherein the maximum parameter value K indicates a maximum precision of the QP value.

Aspect 13B—The method of Aspect 12B, wherein the maximum parameter value K equal to 3 indicates the maximum precision of 8 QP points per doubling of the scaling step size.

Aspect 14B—The method of Aspect 13B, wherein the parameter value k equal to a first value indicates 8 QP points per doubling of the scaling step size, the parameter value k equal to a second value indicates 4 QP points per doubling of the scaling step size, the parameter value k equal to a third value indicates 2 QP points per doubling of the scaling step size, and the parameter value k equal to a fourth value indicates 1 QP point per doubling of the scaling step size.

Aspect 15B—The method of Aspect 13B, wherein the QP value is derived by multiplying a value of the one or more syntax elements with a function of the parameter value k.

Aspect 16B—The method of any of Aspects 10B-15B, wherein encoding the syntax element that indicates the parameter value k comprises: encoding the syntax element that indicates the parameter value k in one or more of a sequence parameter set, a geometry parameter set, an adaptation parameter set, a slice, or a data unit.

Aspect 17B—The method of any of Aspects 10B-16B, wherein encoding the point cloud using the QP value comprises: quantizing a node position of the point cloud using the determined QP.

Aspect 18B—An apparatus configured to encode a point cloud, the apparatus comprising: means for determining a quantization parameter (QP) value based on a parameter value k, wherein the parameter value k specifies a number of QP points per doubling of a scaling step size to be used at a decoder; means for encoding the point cloud using the QP value; means for encoding one or more syntax elements that indicate the QP value; and means for encoding a syntax element that indicates the parameter value k.

Aspect 19B—A non-transitory computer-readable storage medium storing instructions that, when executed, cause one or more processors of a device configured to encode a point cloud to: determine a quantization parameter (QP) value based on a parameter value k, wherein the parameter value k specifies a number of QP points per doubling of a scaling step size to be used at a decoder; encode the point cloud using the QP value; encode one or more syntax elements that indicate the QP value; and encode a syntax element that indicates the parameter value k.

Aspect 20B—An apparatus configured to decode a point cloud, the apparatus comprising: a memory configured to store the point cloud; and one or more processors implemented in circuitry and in communication with the memory, the one or more processors configured to: decode one or more syntax elements that indicate a QP value; decode a syntax element that indicates a parameter value k, wherein the parameter value k specifies a number of QP points per doubling of a scaling step size; determine the scaling step size based on the QP value and the parameter value k; and decode the point cloud using the determined scaling step size.

Aspect 21B—The apparatus of Aspect 20B, wherein the one or more syntax elements that indicate the QP value comprise a value right shifted by the parameter value k.

Aspect 22B—The apparatus of Aspect 20B, wherein the parameter value k is an integer that ranges from 0 to a maximum parameter value K, wherein the maximum parameter value K indicates a maximum precision of the QP value.

Aspect 23B—The apparatus of Aspect 22B, wherein the maximum parameter value K equal to 3 indicates the maximum precision of 8 QP points per doubling of the scaling step size.

Aspect 24B—The apparatus of Aspect 23B, wherein the parameter value k equal to a first value indicates 8 QP points per doubling of the scaling step size, the parameter value k equal to a second value indicates 4 QP points per doubling of the scaling step size, the parameter value k equal to a third value indicates 2 QP points per doubling of the scaling step size, and the parameter value k equal to a fourth value indicates 1 QP point per doubling of the scaling step size.

Aspect 25B—The apparatus of Aspect 23B, wherein one or more processors are configured to: multiply a value of the one or more syntax elements with a function of the parameter value k to derive the QP value.

Aspect 26B—The apparatus of any of Aspects 20B-25B, wherein to decode the syntax element that indicates the parameter value k, the one or more processors are further configured to: decode the syntax element that indicates the parameter value k from one or more of a sequence parameter set, a geometry parameter set, an adaptation parameter set, a slice, or a data unit.

Aspect 27B—The apparatus of any of Aspects 20B-26B, wherein to decode the point cloud using the determined scaling step size, the one or more processors are further configured to: scale a node position of the point cloud using the determined scaling step size.

Aspect 28B—The apparatus of any of Aspects 20B-27B, further comprising: a display configured to display the point cloud.

Aspect 29B—A method of decoding a point cloud, the method comprising: decoding one or more syntax elements that indicate a QP value; decoding a syntax element that indicates a parameter value k, wherein the parameter value k specifies a number of QP points per doubling of a scaling step size; determining the scaling step size based on the QP value and the parameter value k; and decoding the point cloud using the determined scaling step size.

Aspect 30B—The method of Aspect 29B, wherein the one or more syntax elements that indicate the QP value comprise a value right shifted by the parameter value k.

Aspect 31B—The method of Aspect 29B, wherein the parameter value k is an integer that ranges from 0 to a maximum parameter value K, wherein the maximum parameter value K indicates a maximum precision of the QP value.

Aspect 32B—The method of Aspect 31B, wherein the maximum parameter value K equal to 3 indicates the maximum precision of 8 QP points per doubling of the scaling step size.

Aspect 33B—The method of Aspect 32B, wherein the parameter value k equal to a first value indicates 8 QP points per doubling of the scaling step size, the parameter value k equal to a second value indicates 4 QP points per doubling of the scaling step size, the parameter value k equal to a third value indicates 2 QP points per doubling of the scaling step size, and the parameter value k equal to a fourth value indicates 1 QP point per doubling of the scaling step size.

Aspect 34B—The method of Aspect 32B, further comprising: multiplying a value of the one or more syntax elements with a function of the parameter value k to derive the QP value.

Aspect 35B—The method of any of Aspects 29B-34B, wherein decoding the syntax element that indicates the parameter value k comprises: decoding the syntax element that indicates the parameter value k from one or more of a sequence parameter set, a geometry parameter set, an adaptation parameter set, a slice, or a data unit.

Aspect 36B—The method of any of Aspects 29B-35B, wherein decoding the point cloud using the determined scaling step size comprises: scaling a node position of the point cloud using the determined scaling step size.

Aspect 37B—An apparatus configured to decode a point cloud, the apparatus comprising: means for decoding one or more syntax elements that indicate a QP value; means for decoding a syntax element that indicates a parameter value k, wherein the parameter value k specifies a number of QP points per doubling of a scaling step size; means for determining the scaling step size based on the QP value and the parameter value k; and means for decoding the point cloud using the determined scaling step size.

Aspect 38B—A non-transitory computer-readable storage medium storing instructions that, when executed, cause one or more processors of a device configured to decode a point cloud to: decode one or more syntax elements that indicate a QP value; decode a syntax element that indicates a parameter value k, wherein the parameter value k specifies a number of QP points per doubling of a scaling step size; determine the scaling step size based on the QP value and the parameter value k; and decode the point cloud using the determined scaling step size.

Examples in the various aspects of this disclosure may be used individually or in any combination.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. An apparatus configured to encode a point cloud, the apparatus comprising:
   a memory configured to store the point cloud; and
   one or more processors implemented in circuitry and in communication with the memory, the one or more processors configured to:
      determine a quantization parameter (QP) value based on a parameter value k, wherein the parameter value k specifies a number of QP points per doubling of a scaling step size to be used at a decoder;
      encode the point, cloud using the QP value;
      encode one or more syntax elements that indicate the QP value; and
      encode a syntax element that indicates the parameter value k, wherein the parameter value k is an integer that ranges from 0 to a maximum parameter value K, wherein the maximum parameter value K indicates a maximum precision of the QP value.

2. The apparatus of claim 1, wherein the one or more syntax elements that indicate the QP value comprise a value right shifted by the parameter value k.

3. The apparatus of claim 1, wherein the maximum parameter value K equal to 3 indicates the maximum precision of 8 QP points per doubling of the scaling step size.

4. The apparatus of claim 3, wherein the parameter value k equal to a first value indicates 8 QP points per doubling of the scaling step size, the parameter value k equal to a second value indicates 4 QP points per doubling of the scaling step size, the parameter value k equal to a third value indicates 2 QP points per doubling of the scaling step size, and the parameter value k equal to a fourth value indicates 1 QP point per doubling of the scaling step size.

5. The apparatus of claim 3, wherein the QP value is derived by multiplying a value of the one or more syntax elements with a function of the parameter value k.

6. The apparatus of claim 1, wherein to encode the syntax element that indicates the parameter value k, the one or more processors are further configured to:
   encode the syntax element that indicates the parameter value k in one or more of a sequence parameter set, a geometry parameter set, an adaptation parameter set, a slice, or a data unit.

7. The apparatus of claim 1, wherein to encode the point cloud using the QP value, the one or more processors are further configured to:
   quantize a node position of the point cloud using the determined QP.

8. The apparatus of claim 1, further comprising:
   a sensor configured to generate the point cloud.

9. The apparatus of claim 1, further comprising a modem and a transmitter, coupled to the transmitter, wherein the transmitter is configured to transmit the one or more syntax elements that indicate the QP value, and the syntax element that indicates the parameter value k, wherein the parameter value k is an integer that ranges from 0 to a maximum parameter value K, wherein the maximum parameter value K indicates a maximum precision of the QP value.

10. A method of encoding a point cloud, the method comprising:
    determining a quantization parameter (QP) value based on a parameter value k, wherein the parameter value k specifies a number of QP points per doubling of a scaling step size to be used at a decoder;
    encoding the point cloud using the QP value;
    encoding one or more syntax elements that indicate the QP value; and
    encoding a syntax element that indicates the parameter value k, wherein the parameter value k is an integer that ranges from 0 to a maximum parameter value K, wherein the parameter value k is an integer that ranges from 0 to a maximum parameter value K, wherein the maximum parameter value K indicates a maximum precision of the QP value.

11. The method of claim 10, wherein the one or more syntax elements that indicate the QP value comprise a value right shifted by the parameter value k.

12. The method of claim 10, wherein the maximum parameter value K equal to 3 indicates the maximum precision of 8 QP points per doubling of the scaling step size.

13. The method of claim 12, wherein the parameter value k equal to a first value indicates 8 QP points per doubling of the scaling step size, the parameter value k equal to a second value indicates 4 QP points per doubling of the scaling step size, the parameter value k equal to a third value indicates 2 QP points per doubling of the scaling step size, and the parameter value k equal to a fourth value indicates 1 QP point per doubling of the scaling step size.

14. The method of claim 12, wherein the QP value is derived by multiplying a value of the one or more syntax elements with a function of the parameter value k.

15. The method of claim 10, wherein encoding the syntax element that indicates the parameter value k comprises:
    encoding the syntax element that indicates the parameter value k in one or more of a sequence parameter set, a geometry parameter set, an adaptation parameter set, a slice, or a data unit.

16. The method of claim 10, wherein encoding the point cloud using the QP value comprises:
    quantizing a node position of the point cloud using the determined QP.

17. An apparatus configured to encode a point cloud, the apparatus comprising:
    means for determining a quantization parameter (QP) value based on a parameter value k, wherein the parameter value k specifies a number of QP points per doubling of a scaling step size to be used at a decoder:
    means for encoding the point cloud using the QP value;
    means for encoding one or more syntax elements that indicate the QP value; and
    means for encoding a syntax element that indicates the parameter value k, wherein the parameter value k is an integer that ranges from 0 to a maximum parameter value K, wherein the maximum parameter value K indicates a maximum precision of the QP value.

18. A non-transitory computer-readable storage medium storing instructions that, when executed, cause one or more processors of a device configured to encode a point cloud to:
    determine a quantization parameter (QP) value based on a parameter value k, wherein the parameter value k specifies a number of QP points per doubling of a scaling step size to be used at a decoder:
    encode the point cloud using the QP value;
    encode one or more syntax elements that indicate the QP value; and
    encode a syntax element that, indicates the parameter value k, wherein the parameter value k is an integer that ranges from 0 to a maximum parameter value K wherein the maximum parameter value K indicates a maximum precision of the OP value.

19. An apparatus configured to decode a point cloud, the apparatus comprising:
    a memory configured to store the point cloud; and
    one or more processors implemented in circuitry and in communication with the memory, the one or more processors configured to:
    decode one or more syntax elements that indicate a QP value;
    decode a syntax element that indicates a parameter value k, wherein the parameter value k specifies a number of QP points per doubling of a scaling step size:
    determine the scaling step size based on the QP value and the parameter value kz wherein the parameter value k is an integer that ranges from 0 to a maximum parameter value K, wherein the maximum parameter value K indicates a maximum precision of the QP value; and
    decode the point cloud using the determined scaling step size.

20. The apparatus of claim 19, wherein the one or more syntax elements that indicate the QP value comprise a value right shifted by the parameter value k.

21. The apparatus of claim 19, wherein the maximum parameter value K equal to 3 indicates the maximum precision of 8 QP points per doubling of the scaling step size.

22. The apparatus of claim 21, wherein the parameter value k equal to a first value indicates 8 QP points per doubling of the scaling step size, the parameter value k equal to a second value indicates 4 QP points per doubling of the scaling step size, the parameter value k equal to a third value indicates 2 QP points per doubling of the scaling step size, and the parameter value k equal to a fourth value indicates 1 QP point per doubling of the scaling step size.

23. The apparatus of claim 21, wherein one or more processors are configured to:
    multiply a value of the one or more syntax elements with a function of the parameter value k to derive the QP value.

24. The apparatus of claim 19, wherein to decode the syntax element that indicates the parameter value k, the one or more processors are further configured to:
    decode the syntax element that indicates the parameter value k from one or more of a sequence parameter set, a geometry parameter set, an adaptation parameter set, a slice, or a data unit.

25. The apparatus of claim 19, wherein to decode the point cloud using the determined scaling step size, the one or more processors are further configured to:
    scale a node position of the point cloud using the determined scaling step size.

26. The apparatus of claim 19, further comprising:
    a display configured to display the point cloud.

27. The apparatus of claim 19, further comprising a modem and a receiver, coupled to the receiver, wherein the receiver is configured to receive the one or more syntax elements that indicate the QP value, and the syntax element that indicates the parameter value k, wherein the parameter value k is an integer that ranges from 0 to a maximum parameter value K, wherein the maximum parameter value K indicates a maximum precision of the QP value.

28. A method of decoding a point cloud, the method comprising:
    decoding one or more syntax elements that indicate a QP value;
    decoding a syntax element that indicates a parameter value k, wherein the parameter value k specifies a number of QP points per doubling of a scaling step size;
    determining the scaling step size based on the QP value and the parameter value k, wherein the parameter value k is an integer that ranges from 0 to a maximum parameter value K, wherein the maximum parameter value K indicates a maximum precision of the QP value; and
    decoding the point cloud using the determined scaling step size.

29. The method of claim 28, wherein the one or more syntax elements that indicate the QP value comprise a value right shifted by the parameter value k.

30. The method of claim 29, wherein the maximum parameter value K equal to 3 indicates the maximum precision of 8 QP points per doubling of the scaling step size.

31. The method of claim 30, wherein the parameter value k equal to a first value indicates 8 QP points per doubling of the scaling step size, the parameter value k equal to a second value indicates 4 QP points per doubling of the scaling step size, the parameter value k equal to a third value indicates 2 QP points per doubling of the scaling step size, and the parameter value k equal to a fourth value indicates 1 QP point per doubling of the scaling step size.

32. The method of claim 30, further comprising:
multiplying a value of the one or more syntax elements with a function of the parameter value k to derive the QP value.

33. The method of claim 28, wherein decoding the syntax element that indicates the parameter value k comprises:
decoding the syntax element that indicates the parameter value k from one or more of a sequence parameter set, a geometry parameter set, an adaptation parameter set, a slice, or a data unit.

34. The method of claim 28, wherein decoding the point cloud using the determined scaling step size comprises:
scaling a node position of the point cloud using the determined scaling step size.

35. An apparatus configured to decode a point cloud, the apparatus comprising:
means for decoding one or more syntax elements that indicate a QP value;
means for decoding a syntax element that indicates a parameter value k, wherein the parameter value k specifies a number of QP points per doubling of a scaling step size;
means for determining the scaling step size based on the QP value and the parameter value k, wherein the parameter value k is an integer that ranges from 0 to a maximum parameter value K, wherein the maximum parameter value K indicates a maximum precision of the QP value; and
means for decoding the point cloud using the determined scaling step size.

36. A non-transitory computer-readable storage medium storing instructions that, when executed, cause one or more processors of a device configured to decode a point cloud to:
decode one or more syntax elements that indicate a QP value;
decode a syntax element that indicates a parameter value k, wherein the parameter value k specifies a number of QP points per doubling of a scaling step size;
determine the scaling step size based on the QP value and the parameter value k, wherein the parameter value k is an integer that ranges from 0 to a maximum parameter value K, wherein the maximum parameter value K indicates a maximum precision of the QP value; and
decode the point cloud using the determined scaling step size.

* * * * *